US011989925B2

(12) United States Patent
Takahashi et al.

(10) Patent No.: US 11,989,925 B2
(45) Date of Patent: May 21, 2024

(54) IMAGE MATCHING APPARATUS

(71) Applicant: NEC Corporation, Tokyo (JP)

(72) Inventors: Toru Takahashi, Tokyo (JP); Rui Ishiyama, Tokyo (JP); Kengo Makino, Tokyo (JP); Yuta Kudo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 401 days.

(21) Appl. No.: 17/606,488

(22) PCT Filed: May 16, 2019

(86) PCT No.: PCT/JP2019/019532
§ 371 (c)(1),
(2) Date: Oct. 26, 2021

(87) PCT Pub. No.: WO2020/230320
PCT Pub. Date: Nov. 19, 2020

(65) Prior Publication Data
US 2022/0198777 A1    Jun. 23, 2022

(51) Int. Cl.
*G06K 9/00*     (2022.01)
*G06T 3/10*     (2024.01)
(Continued)

(52) U.S. Cl.
CPC .............. *G06V 10/753* (2022.01); *G06T 3/10* (2024.01); *G06T 7/11* (2017.01); *G06V 10/40* (2022.01);
(Continued)

(58) Field of Classification Search
CPC .... G06V 10/753; G06V 10/40; G06V 10/761; G06V 10/431; G06T 3/10; G06T 7/11; G06T 2207/20021
See application file for complete search history.

(56) References Cited

U.S. PATENT DOCUMENTS 9,747,521 B2 *   8/2017   Iakovenko ........... G06V 10/462
11,227,196 B2 *  1/2022   Takahashi .......... G06V 30/1985
(Continued)

FOREIGN PATENT DOCUMENTS

| CN | 109479134 A | * | 3/2019 | ............. H04N 19/13 |
| JP | H09-22406 A |   | 1/1997 | |

(Continued)

OTHER PUBLICATIONS

A Study of fast Image matching Method—Rotation, Toru Takahashi et al., IEICE Technical Rreport, Mar. 2018, pp. 37-42 (Year: 2018).*
(Continued)

*Primary Examiner* — Jayesh A Patel
(74) *Attorney, Agent, or Firm* — Sughrue Mion, PLLC

(57) ABSTRACT

An image matching apparatus matching a first image against a second image includes an acquiring unit, a generating unit, and a determining unit. The acquiring unit acquires a frequency feature of the first image and a frequency feature of the second image. The generating unit synthesizes the frequency feature of the first image and the frequency feature of the second image, and generates a quantized synthesized frequency feature in which a value of an element is represented by a binary value or a ternary value. The determining unit calculates a score indicating a degree to which the quantized synthesized frequency feature is a square wave having a single period, and matches the first image against the second image based on the score.

20 Claims, 22 Drawing Sheets

(51) Int. Cl.
- *G06T 7/11* (2017.01)
- *G06V 10/40* (2022.01)
- *G06V 10/74* (2022.01)
- *G06V 10/75* (2022.01)

(52) U.S. Cl.
CPC .. *G06V 10/761* (2022.01); *G06T 2207/20021* (2013.01)

(56) References Cited

U.S. PATENT DOCUMENTS

| | | | | |
|---|---|---|---|---|
| 2009/0274997 | A1* | 11/2009 | Kosuge | G06V 10/431 433/215 |
| 2010/0241924 | A1* | 9/2010 | Nishi | H03M 13/6312 714/746 |
| 2011/0188705 | A1* | 8/2011 | Tabaru | G06F 18/00 382/103 |
| 2014/0226906 | A1* | 8/2014 | Kang | G06V 10/462 382/197 |
| 2018/0225494 | A1* | 8/2018 | Rhee | G06V 40/1365 |
| 2019/0287266 | A1* | 9/2019 | Takahashi | G06K 19/06028 |

FOREIGN PATENT DOCUMENTS

| | | | |
|---|---|---|---|
| JP | H0922406 | A * | 1/1997 |
| JP | H10320552 | A * | 12/1998 |
| JP | 3254622 | B2 * | 2/2002 |
| JP | 3254622 | B2 | 2/2002 |
| JP | 2008-015848 | A | 1/2008 |
| JP | 2008015848 | A * | 1/2008 |
| WO | 2019/069617 | A1 | 4/2019 |
| WO | WO20190696171 | A * | 11/2019 |

OTHER PUBLICATIONS

Efficient reconstruction of sampled 1-bit quantized Gaussian signals from sine wave crossings, Marco Lanucara et al., Elsevier, 2012, pp. 1044-1055 (Year: 2012).*
Asymmetric Correlation: A noise—Template Matching, Elhanan Elboher et al., IEEE, 2013, pp. 3062-3073 (Year: 2013).*
A new square wave transform based on the DCT, Tarek I. Haweel, Elsevier, 2001, pp. 2309-2319 (Year: 2001).*
Extended European Search Report for EP Application No. 19928843.2 dated Apr. 21, 2022.
Anonymous: "Spectral density-Wikipedia", May 2, 2019 (May 2, 2019), XP055910340.
Anonymous: "Cross-correlation-Wikipedia", Mar. 18, 2019 (Mar. 18, 2019), XP056910341.
International Search Report for PCT Application No. PCT/JP2019/019532, dated Jun. 11, 2019.
Toru Takahashi et al., "A Study of Fast Image Matching Method Under Translation, Scale and Rotation", IEICE technical report, Mar. 2018, pp. 37-42, Japan.
Qin-sheng Chen et al., "Symmetric Phase-Only Matched Filtering of Fourier-Mellin Transforms for Image Registration and Recognition", IEEE Transactions on Pattern Analysis and Machine Intelligence vol. 16, No. 12, Dec. 1994, pp. 1156-1168, [online] https://ieeexplore.ieee.org/stamp/stamp.jsp?(p=&arnumber=387491.

* cited by examiner

FIG. 5

$$F(k_1, k_2) = \sum_{n_1, n_2} f(n_1, n_2) W_{N_1}^{k_1 n_1} W_{N_2}^{k_2 n_2}$$

$$= A_F(k_1, k_2) e^{j\theta_F(k_1, k_2)} \quad \cdots (1)$$

$$G(k_1, k_2) = \sum_{n_1, n_2} g(n_1, n_2) W_{N_1}^{k_1 n_1} W_{N_2}^{k_2 n_2}$$

$$= A_G(k_1, k_2) e^{j\theta_G(k_1, k_2)} \quad \cdots (2)$$

$$W_{N_1} = e^{-j\frac{2\pi}{N_1}} \quad \cdots (3)$$

$$W_{N_2} = e^{-j\frac{2\pi}{N_2}} \quad \cdots (4)$$

$$\sum_{n_1, n_2} = \sum_{n_1 = -M_1}^{M_1} \sum_{n_2 = -M_2}^{M_2} \quad \cdots (5)$$

FIG. 8

$$R(k_1,k_2) = \frac{F(k_1,k_2)\overline{G(k_1,k_2)}}{|F(k_1,k_2)\overline{G(k_1,k_2)}|}$$

$$= e^{j(\theta_F(k_1,k_2) - \theta_G(k_1,k_2))}$$

$$\cdots (6)$$

FIG. 9

$$F(k_1,k_2) = A_F(k_1,k_2)e^{j\theta_F(k_1,k_2)} \quad \cdots (7)$$

$$G(k_1,k_2) = A_G(k_1,k_2)e^{j\theta_G(k_1,k_2)}$$
$$\cong F(k_1,k_2)\cdot e^{-j\frac{2\pi}{N_1}k_1\delta_1}e^{-j\frac{2\pi}{N_2}k_2\delta_2} \quad \cdots (8)$$

$$R(k_1,k_2) = \frac{F(k_1,k_2)\overline{G(k_1,k_2)}}{|F(k_1,k_2)\overline{G(k_1,k_2)}|}$$
$$\cong e^{j\frac{2\pi}{N_1}k_1\delta_1}e^{j\frac{2\pi}{N_2}k_2\delta_2} \quad \cdots (9)$$

FIG. 13

$$H_{2m} = \begin{bmatrix} H_m & H_m \\ H_m & -H_m \end{bmatrix}, \quad m=2,4,\cdots,\frac{N}{2} \quad \cdots(10)$$

$$H_2 = \begin{bmatrix} 1 & 1 \\ 1 & -1 \end{bmatrix} \quad \cdots(11)$$

FIG. 14

$$Y = H_N X H_N \quad \cdots (12)$$

IMAGE MATCHING APPARATUS

This application is a National Stage Entry of PCT/JP2019/019532 filed on May 16, 2019, the contents of all of which are incorporated herein by reference, in their entirety.

TECHNICAL FIELD

The present invention relates to an image matching apparatus, an image matching method, and a program.

BACKGROUND ART

Various image matching methods for matching a compared image against a registered image for the purpose of individual identification and so on have been proposed or put into practical use.

For example, in Patent Document 1, first, a compared image and a registered image are transformed into the frequency domain by using the Fourier transform. Next, a cross power spectrum is calculated from the respective complex spectra of the compared image and the registered image obtained by the above transformation. Next, the cross power spectrum is normalized to phase components alone by eliminating power components using a weight filter for each frequency. Next, a correlation efficient on a real coordinate domain is calculated by applying the inverse Fourier transform to the normalized cross power spectrum. Next, pattern matching determination is performed by using coordinates that make the calculated correlation coefficient the maximum value.

Further, in Patent Document 2, a registered Fourier image is created in advance by applying the Fourier transform to a registered image. Next, a compared Fourier image is created by applying the Fourier transform to a compared image. Next, the compared Fourier image and the registered Fourier image created in advance are synthesized. Next, an amplitude suppression process is performed on the above synthesized Fourier image and then the inverse Fourier transform is applied. Next, the upper n pixels with correlation components having higher intensity are extracted from a predetermined correlation component area appearing in the synthetized Fourier image with the inverse Fourier transform applied. Then, based on the intensity of the correlation components of the extracted n pixels, it is determined whether or not the registered image and the compared image match.

Further, in Non-Patent Document 1, by obtaining a normalized cross power spectrum that is a synthesized frequency feature obtained by synthesizing the frequency feature of a registered image and the frequency feature of a compared image, and determining a distribution shape in the frequency feature, the compared image is matched against the registered image. Non-Patent Document 1 focuses on that in the case of a pair of identical images with a position gap, a normalized cross power spectrum of the frequency features of the two images becomes a complex sine wave having a single period with respect to a discrete frequency index. Then, in Non-Patent Document 1, by calculation of the partial differential of the normalized cross power spectrum, calculation of the absolute values of the elements with respect to the obtained differential result, and calculation of the variance of the obtained absolute values, a score indicating a degree that the normalized cross power spectrum of the frequency features of the two images is a complex sine wave having a single period is calculated, and the two images are matched against each other based on the score.

Patent Document 1: Japanese Unexamined Patent Application Publication No. JP-A 2008-015848
Patent Document 2: Japanese Patent No. 3254622
Non-Patent Document 1: Tom Takahashi, Kengo Makino, Yuta Kudo, Rui Ishiyama, "A Study of Fast Image Matching Method Under Translation, Scale, and Rotation", IEICE Technical Report, BioX2017-42, PRMU2017-178, March 2018

As described in Patent Document 1 and Patent Document 2, in the case of matching two images against each other, it is general to use the result of synthesizing the frequency features of the two images and applying the inverse Fourier transform to the synthesized frequency feature. However, the complexity of the inverse Fourier transform is large. Therefore, it is difficult to match two images against each other at high speeds.

On the other hand, according to the image matching technique described in Non-Patent Document 1, the inverse Fourier transform is not required, and the matching score can be calculated by lighter operations. However, although it is lighter than the inverse Fourier transform, the complexity required to calculate the matching score is still large. The reason is as follows. In order to calculate a score indicating a degree that the normalized cross power spectrum of the frequency features of two images is a complex sine wave having a single period, there is a need to obtain the normalized cross power spectrum as a complex sine wave while minimizing an error. For this, many bits need to be allocated to represent the elements of the normalized cross power spectrum. Then, as the number of bits representing the elements increases, the complexity of the abovementioned partial differential calculation, calculation of absolute values of the elements, and calculation of variance of the obtained absolute values for calculating a score indicating a degree that the normalized cross power spectrum is a complex sine wave having a single period increases.

SUMMARY

An object of the present invention is to provide an image matching apparatus that solves the abovementioned problem; it is difficult to match two images against each other at high speeds.

An image matching apparatus according to an aspect of the present invention is an image matching apparatus matching a first image against a second image. The image matching apparatus includes: an acquiring unit configured to acquire a frequency feature of the first image and a frequency feature of the second image; a generating unit configured to synthesize the frequency feature of the first image and the frequency feature of the second image, and generate a quantized synthesized frequency feature in which a value of an element is represented by a binary value or a ternary value; and a determining unit configured to calculate a score indicating a degree to which the quantized synthesized frequency feature is a square wave having a single period, and match the first image against the second image based on the score.

Further, an image matching method according to another aspect of the present invention is an image matching method for matching a first image against a second image. The image matching method includes: acquiring a frequency feature of the first image and a frequency feature of the second image; synthesizing the frequency feature of the first image and the frequency feature of the second image, and generating a quantized synthesized frequency feature in which a value of an element is represented by a binary value or a ternary value; and calculating a score indicating a degree to which the quantized synthesized frequency feature is a square wave having a single period, and matching the first image against the second image based on the score.

Further, a non-transitory computer-readable recording medium according to another aspect of the present invention has a program recorded thereon. The program includes instructions for causing a computer matching a first image against a second image to execute: a process of acquiring a frequency feature of the first image and a frequency feature of the second image; a process of synthesizing the frequency feature of the first image and the frequency feature of the second image, and generating a quantized synthesized frequency feature in which a value of an element is represented by a binary value or a ternary value; and a process of calculating a score indicating a degree to which the quantized synthesized frequency feature is a square wave having a single period, and matching the first image against the second image based on the score.

With the configurations described above, the present invention enables high-speed matching of a first image and a second image.

BRIEF DESCRIPTION OF DRAWINGS

FIG. 5 is a view showing an example of formulas representing the frequency feature of a first image and the frequency feature of a second image;

FIG. 8 is a view showing an example of a formula for calculating a normalized cross power spectrum;

FIG. 9 is a view showing an example of formulas showing a frequency feature $F(k_1, k_2)$, a frequency feature $G(k_1, k_2)$, and a normalized cross power spectrum $R(k_1, k_2)$ of a pair of identical images with position gap;

FIG. 13 is an explanatory view of a Hadamard matrix;

FIG. 14 is a view showing an equation representing orthogonal transformation using the Hadamard matrix;

EXAMPLE EMBODIMENTS

Next, example embodiments of the present invention will be described in detail with reference to the drawings.

First Example Embodiment

Figure 1:
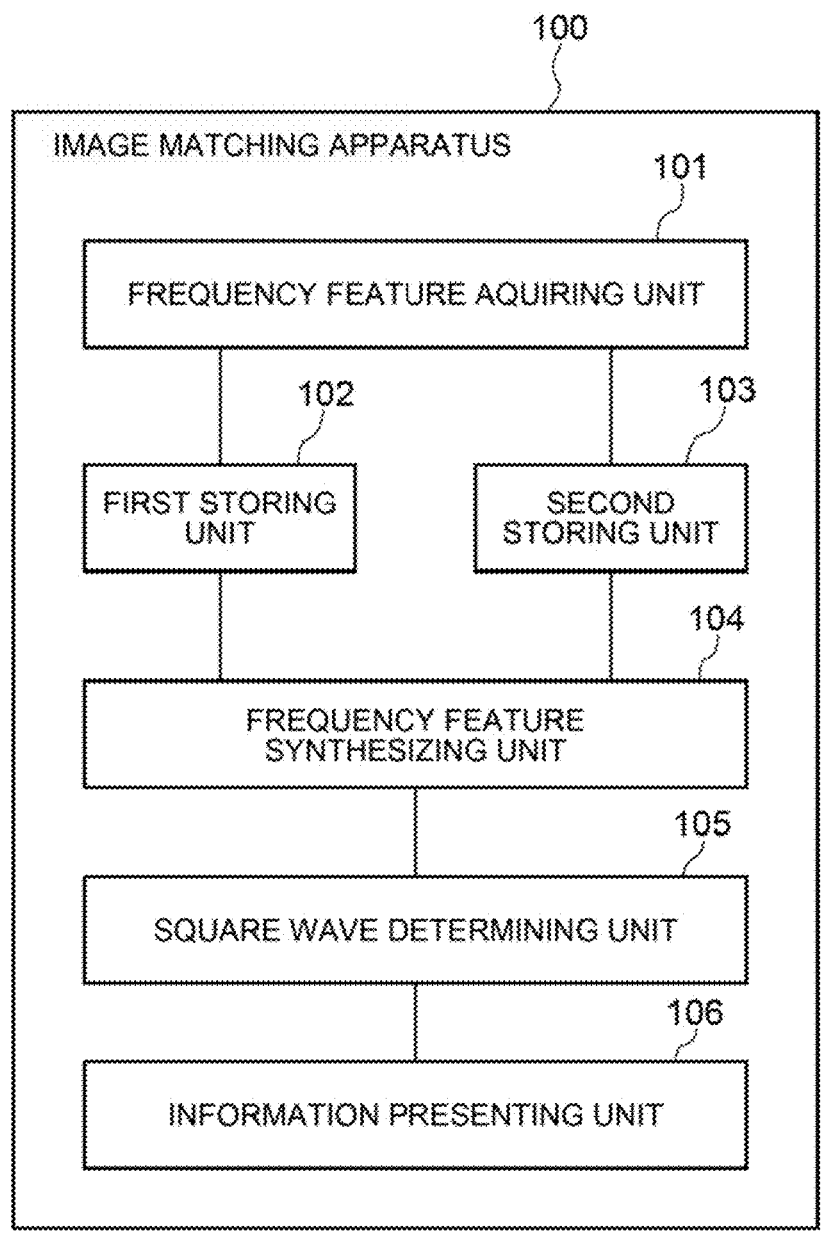
FIG. 1 is a block diagram of an image matching apparatus according to a first example embodiment of the present invention.

FIG. 1 is a block diagram of an image matching apparatus according to a first example embodiment of the present invention. An image matching apparatus 100 according to this example embodiment is configured to match a first image against a second image. Referring to FIG. 1, the image matching apparatus 100 includes a frequency feature acquiring unit 101, a first storing unit 102, a second storing unit 103, a frequency feature synthesizing unit 104, a square wave determining unit 105, and an information presenting unit 106.

The frequency feature acquiring unit 101 is configured to acquire the frequency features of a first image and a second image. A frequency feature refers to two-dimensional data (two-dimensional array) as a result of applying the Fourier transform (discrete Fourier transform) to an image and thereby transforming into the frequency domain. Frequency transform other than the Fourier transform, for example, Wavelet transform may be performed.

Herein, a first image is, for example, a compared image obtained by imaging an object to be compared. A second image is one of a plurality of registered images obtained by imaging a plurality of objects to be registered. One or a plurality of second images are present. An object is, for example, an industrial product, a commercial product, or the like. On the surface of an object, there is a fine pattern that naturally occurs in the same production process such as fine irregularities or patterns or a random pattern on the material surface. By acquiring a difference in such a pattern on the surface of an object as an image by an imaging device such as a camera and recognizing the fine pattern, it is possible to perform individual identification and management of each product. This example embodiment relates to an image matching technique for such individual identification.

The first storing unit 102 is configured to store the frequency feature of the first image. The second storing unit 103 is configured to store the frequency feature of the second image.

The frequency feature synthesizing unit 104 is configured to synthesize the frequency feature of the first image stored in the first storing unit 102 and the frequency feature of the second image stored in the second storing unit 103, and calculate a normalized cross power spectrum in which the values of elements are represented by binary or ternary values (hereinafter, referred to as a quantized cross power spectrum).

The square wave determining unit 105 is configured to calculate a score indicating a degree that the quantized cross power spectrum calculated by the frequency feature synthesizing unit 104 is a square wave signal having a single period. Moreover, the square wave determining unit 105 is configured to match the first image against the second image based on the calculated score. That is to say, the square wave determining unit 105 uses a score indicating a degree that a quantized cross power spectrum quantized into binary or ternary values is a square wave signal having a single period, as a score representing the degree of similarity between the first image and the second image.

The information presenting unit 106 is configured to present the result of matching of the first image and the second image based on the result of determination by the square wave determining unit 105. The presentation of the matching result may be, for example, displaying the matching result on a display device, or printing the matching result on a sheet of paper by a printing device, or transmitting a message describing the matching result to an external terminal by a communication device.

Figure 2:
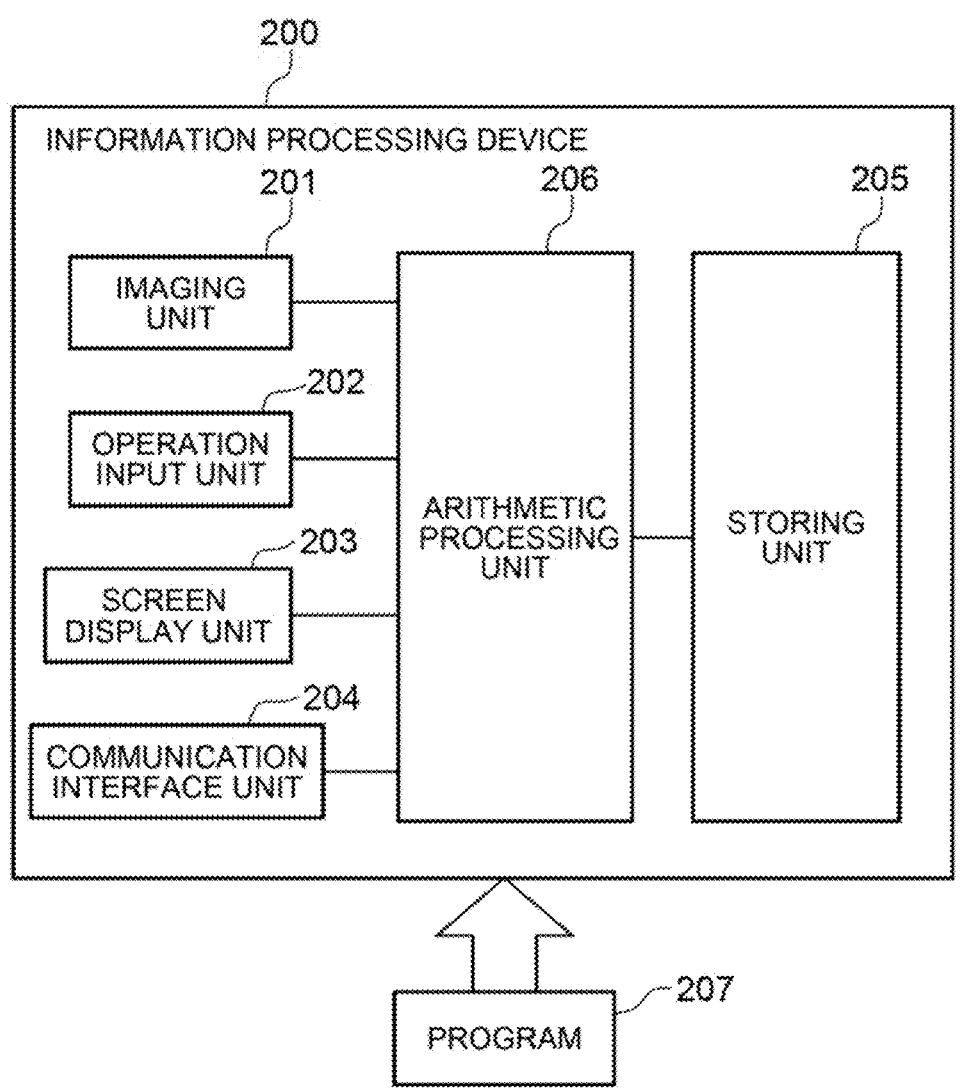
FIG. 2 is a block diagram showing an example of a hardware configuration of the image matching apparatus according to the first example embodiment of the present invention.

For example, as shown in FIG. 2, the image matching apparatus 100 can be realized by an information processing device 200 that includes an imaging unit 201 such as a camera, an operation input unit 202 such as a keyboard and a mouse, a screen display unit 203 such as a liquid crystal display, a communication interface unit 204, a storing unit 205 such as a memory and a hard disk and an arithmetic processing unit 206 such as one or more microprocessors, and a program 207. The information processing device 200 may be, for example, a personal computer or a smartphone.

The program 207 is loaded into a memory from an external computer-readable storage medium when the information processing device 200 is started, and controls an operation of the arithmetic processing unit 206 to realize on the arithmetic processing unit 206 functional units such as the frequency feature acquiring unit 101, the first storing unit 102, the second storing unit 103, the frequency feature synthesizing unit 104, the square wave determining unit 105, and the information presenting unit 106.

Next, the outline of an operation of the image matching apparatus 100 according to this example embodiment will be described.

Figure 3:
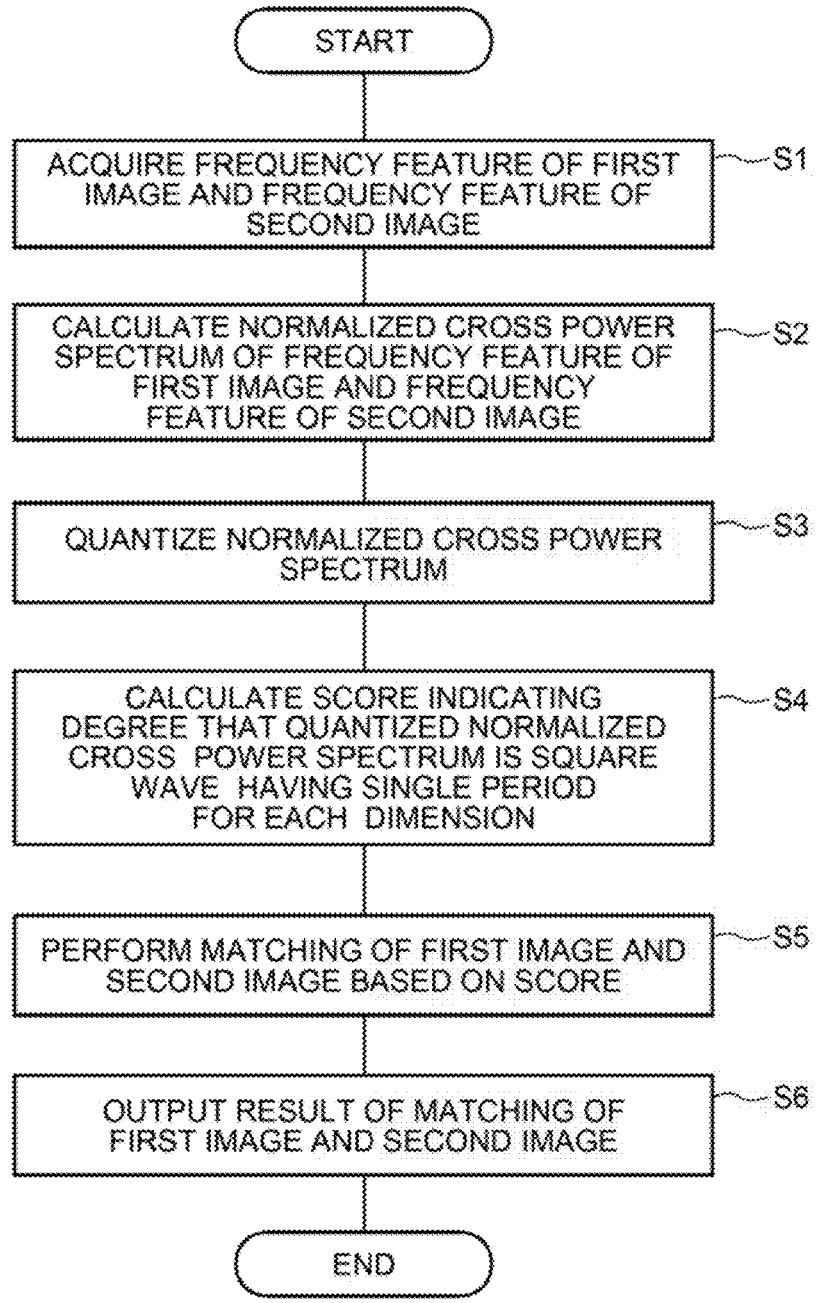
FIG. 3 is a flowchart showing the outline of an operation of the image matching apparatus according to the first example embodiment of the present invention.

FIG. 3 is a flowchart showing the outline of the operation of the image matching apparatus 100. First, the frequency feature acquiring unit 101 acquires the frequency feature of the first image and the frequency feature of the second image (step S1). In a case where a plurality of second images are present, the frequency feature acquiring unit 101 acquires a frequency feature from each of the second images. The frequency feature acquiring unit 101 stores the acquired frequency feature of the first image into the first storing unit 102, and stores the acquired frequency feature of the second image into the second storing unit 103.

Next, the frequency feature synthesizing unit 104 calculates a normalized cross power spectrum of the frequency feature of the first image stored in the first storing unit 102 and the frequency feature of the second image stored in the second storing unit 103 (step S2). In a case where there are a plurality of frequency features of second images, the frequency feature synthesizing unit 104 calculates a plurality of normalized cross power spectra of the frequency feature of the first image and the respective frequency features of the second images. Moreover, the frequency feature synthesizing unit 104 quantizes the calculated normalized cross power spectrum, and transforms the value of each of the elements to binary or ternary data (step S3). In a case where there are a plurality of normalized cross power spectra, the frequency feature synthesizing unit 104 quantizes the respective normalized cross power spectra.

Next, the square wave determining unit 105 calculates a score indicating a degree that the quantized cross power spectrum obtained from the frequency feature synthesizing unit 104 is a square wave having a single period (step S4). When a plurality of quantized cross power spectra are present, the square wave determining unit 105 calculates, for each of the quantized cross power spectra, a score indicating a degree that it is a square wave having a single period.

Next, the square wave determining unit 105 matches the first image against the second image based on the calculated score (step S5).

For example, in a case where there is one second image, the square wave determining unit 105 derives a matching result indicating that the first image and the second image match (identical) when the score satisfies a predetermined reference value. On the other hand, when the score does not satisfy the predetermined reference value, the square wave determining unit 105 derives a matching result indicating that the first image and the second image do not match (not identical).

Further, for example, in a case where a plurality of second images are present, when a best score among a plurality of scores calculated for a plurality of cross power spectra corresponding to the plurality of second images satisfies a predetermined reference value, the square wave determining unit 105 derives a matching result indicating that the first image and the second image of the best score match (identical). On the other hand, when the best score does not satisfy the predetermined reference value, the square wave determining unit 105 derives a matching result indicating that the first image and the second image do not match (not identical).

Next, the information presenting unit 106 presents the result of matching of the first image and the second image obtained from the square wave determining unit 105.

Next, the respective units of the image matching apparatus 100 according to this example embodiment will be described in detail.

First, the frequency feature acquiring unit 101 will be described in detail.

Figure 4:
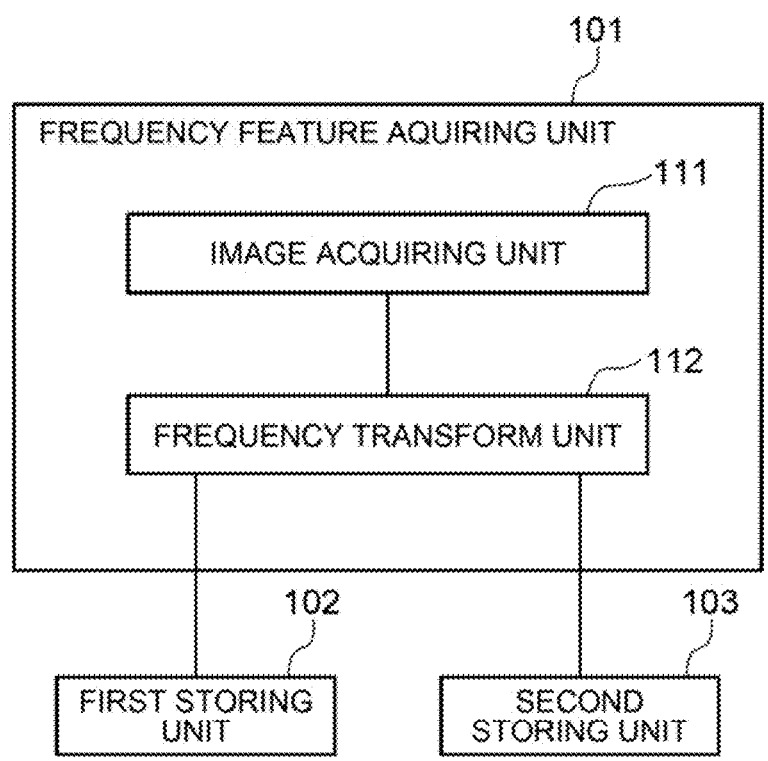
FIG. 4 is a block diagram showing an example of a frequency feature acquiring unit in the image matching apparatus according to the first example embodiment of the present invention.

FIG. 4 is a block diagram showing an example of the frequency feature acquiring unit 101. The frequency feature acquiring unit 101 in this example includes an image acquiring unit 111 and a frequency transform unit 112.

The image acquiring unit 111 is configured to acquire the first image and the second image. The image acquiring unit 111 may be, for example, image capture equipment typified by a camera, a scanner, and the like. Alternatively, the image acquiring unit 111 may be an optical sensor that collects visible light and light having a wavelength longer than visible light such as near-infrared light, short-wavelength infrared light and thermal infrared light with a lens and acquires the shape of a target object, or the like, as image data. Alternatively, the image acquiring unit 111 may be a sensor that acquires the intensity of infrared light, ultraviolet light or X-ray and outputs as a two-dimensional data array. Alternatively, the image acquiring unit 111 may be configured to acquire the first image and the second image from an external storage medium such as a CD-ROM or a memory. Alternatively, the image acquiring unit 111 may be configured to receive the first image and the second image via a network. Moreover, the image acquiring unit 111 may acquire the first image and the second image by different methods, respectively.

The frequency transform unit 112 is configured to receive the first image and the second image from the image acquiring unit 111, and output an image (a frequency spectrum image) as a result of applying discrete Fourier transform to each of the images. The frequency transform unit 112 stores the frequency spectrum image of the first image as a first frequency feature into the first storing unit 102, and stores the frequency spectrum of the second image as a second frequency feature into the second storing unit 103.

Next, an example of the frequency features of the first and second images acquired by the frequency feature acquiring unit 101 will be described.

Let the first image and the second image be two images $f(n_1, n_2)$ and $g(n_1, n_2)$ of $N_1 \times N_2$ pixels. Moreover, let a discrete space index (integer) of a two-dimensional image signal be $n_1 = -M_1, \ldots, M_1$ and $n_2 = -M_2, \ldots, M_2$. Herein, $M_1$ and $M_2$ are positive integers, and $N_1 = 2M_1 + 1$ and $N_2 = 2M_2 + 1$. Then, a first frequency feature $F(k_1, k_2)$ obtained by applying two-dimensional discrete Fourier transform to the image $f(n_1, n_2)$ and a second frequency feature $G(k_1, k_2)$ obtained by applying two-dimensional discrete Fourier transform to the image $g(n_1, n_2)$ are given by Equations 1 and 2 shown in FIG. 5. In Equations 1 and 2, $k_1 = -M_1, \ldots, M_1$ and $k_2 = -M_2, \ldots, M_2$ are discrete frequency indexes (integers). Moreover, $W_{N1}$ and $W_{N2}$ are twiddle factors, which are given by Equations 3 and 4 shown in FIG. 5. Moreover, $A_F(k_1, k_2)$ and $A_G(k_1, k_2)$ represent amplitude spectra (amplitude components), and $\theta_F(k_1, k_2)$ and $\theta_G(k_1, k_2)$ represent phase spectra (phase components), respectively. Moreover, $\Sigma_{n1, n2}$ represents addition over the entire index range as shown in Equation 5 of FIG. 5.

Figure 6:
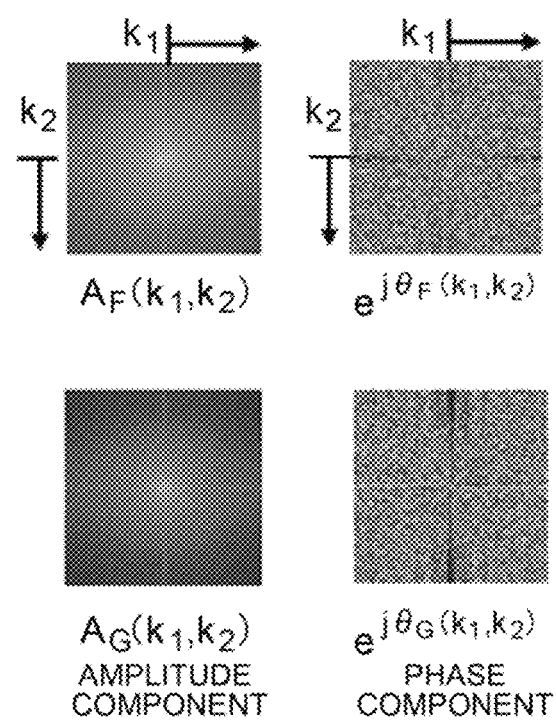
FIG. 6 a view showing an example of an image of amplitude components $A_F(k_1, k_2)$ and $A_G(k_1, k_2)$, and phase components $\theta_F(k_1, k_2)$ and $\theta_G(k_1, k_2)$.

FIG. 6 shows an example of the image of the amplitude components $A_F(k_1, k_2)$ and $A_G(k_1, k_2)$ and the phase components $\theta_F(k_1, k_2)$ and $\theta_G(k_1, k_2)$.

Next, the frequency feature synthesizing unit 104 will be described in detail.

Figure 7:
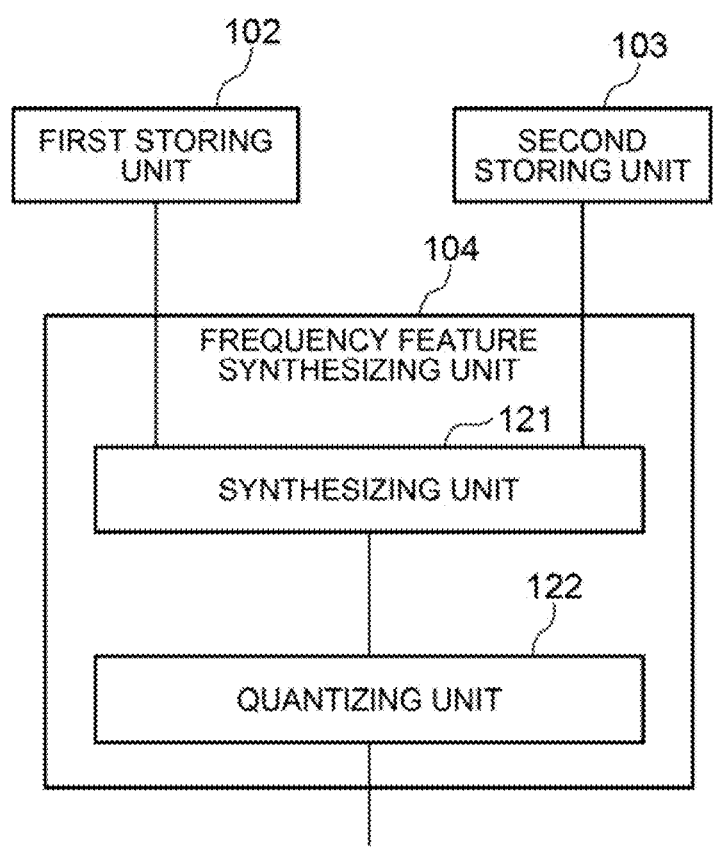
FIG. 7 is a block diagram showing a configuration example of a frequency feature synthesizing unit in the image matching apparatus according to the first example embodiment of the present invention.

FIG. 7 is a block diagram showing an example of the frequency feature synthesizing unit 104. The frequency feature synthesizing unit 104 in this example includes a synthesizing unit 121 and a quantizing unit 122.

The synthesizing unit 121 calculates a normalized cross power spectrum $R(k_1, k_2)$ of the first frequency feature $F(k_1, k_2)$ and the second frequency feature $G(k_1, k_2)$ by Equation 6 shown in FIG. 8. In Equation 6, overline $G(k_1, k_2)$ is a complex conjugate of the second frequency feature $G(k_1, k_2)$. Moreover, $\theta_F(k_1, k_2) - \theta_G(k_1, k_2)$ is a phase difference spectrum of the first frequency feature and the second frequency feature. As shown in Equation 6, the frequency feature synthesizing unit 104 obtains a cross power spectrum that is the product for each element of the first frequency feature $F(k_1, k_2)$ and the complex conjugate of the second frequency feature $G(k_1, k_2)$ and normalizes with the absolute value thereof, thereby calculating the normalized cross power spectrum.

In a case where the image $f(n_1, n_2)$ and the image $g(n_1, n_2)$ are a pair of identical images with position gap, the frequency feature $F(k_1, k_2)$ and the frequency feature $G(k_1, k_2)$ of the images, and the normalized cross power spectrum $R(k_1, k_2)$ of the two frequency features are given by Equations 7, 8 and 9 shown in FIG. 9. Herein, $\delta_1$ and $\delta_2$ denote the amount of position gap between the image $f(n_1, n_2)$ and the image $g(n_1, n_2)$. That is to say, the image $g(n_1, n_2)$ is an image obtained by translating the image $f(n_1, n_2)$ by $(\delta_1, \delta_2)$. As shown in Equation 9, in a case where the two frequency features $F(k_1, k_2)$ and $G(k_1, k_2)$ to be matched are a pair of identical images, the normalized cross power spectrum $R(k_1, k_2)$ thereof is expressed as a complex sine wave having a single period for each of the dimensions (each of $k_1$ and $k_2$). On the other hand, in a case where the two frequency features $F(k_1, k_2)$ and $G(k_1, k_2)$ to be matched are not a pair of identical images, the normalized cross power spectrum $R(k_1, k_2)$ is not a complex sine wave having a single period for each of the dimensions.

Figure 10:
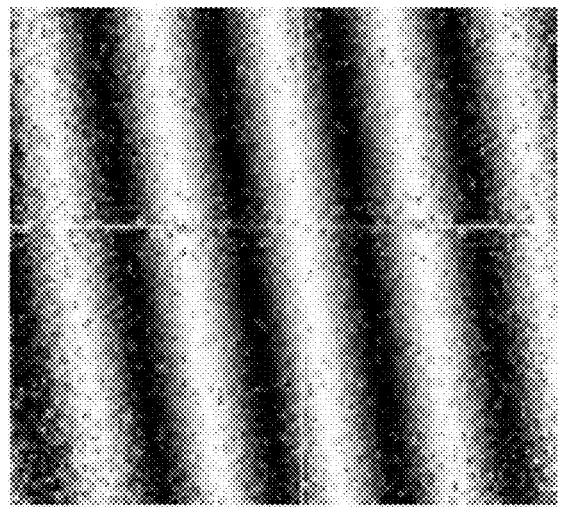
FIG. 10 is a view showing an example of an image of the normalized cross power spectrum $R(k_1, k_2)$ of the pair of identical images.

FIG. 10 shows an example of the image of the normalized cross power spectrum $R(k_1, k_2)$ of a pair of identical images. Thus, a normalized cross power spectrum of a pair of identical images has an image like a wave having a single period when a bright portion is regarded as a peak and a dark portion is regarded as a trough.

The quantizing unit 122 quantizes each element of the normalized cross power spectrum obtained by the synthesizing unit 121 into binary or ternary data. A method for such quantization can be any method. For example, a quantization method as described below may be used.

The quantizing unit 122 substitutes a value (composed of a real part and an imaginary part) of each element of the normalized cross power spectrum obtained by the synthesizing unit 121 with a value obtained by quantizing a predetermined one of the real part and the imaginary part of each element to a binary or ternary value. For example, let the value of a certain element U be $A + Bj$. Herein, A and B are real numbers, and j is an imaginary unit. In the case of quantizing the element U into a binary value, the quantizing unit 122 transforms $A + Bj$ to "+1" if $A \geq 0$, and transforms $A + Bj$ to "−1" if $A < 0$, for example. In this example, the quantizing unit 122 quantizes into a binary value based on the sign of the real number A of the real part, but may quantize into a binary value based on the sign of the real number B of the imaginary part. In the case of quantizing the element U into a ternary value, the quantizing unit 122 transforms $A + Bj$ to "+1" if $A \geq 0$, transforms to "0" if $A = 0$, and transforms $A + Bj$ to "−1" if $A < 0$, for example. In this example, the quantizing unit 122 quantizes into a binary value based on the sign of the real number A of the real part, but may quantize into a binary value based on the sign of the real number B of the imaginary part. According to the quantizing method as described above, the quantizing unit 122 represents each element of the normalized cross power spectrum obtained by the synthesizing unit 121 as 1-bit or 2-bit data.

The reason that the quantizing unit 122 quantizes each element of the normalized cross power spectrum into binary or ternary data is as follows.

In general, a real part and an imaginary part of each element of the normalized cross power spectrum R ($k_1$, $k_2$) are calculated as real number values (floating point numbers), and many bits are required to represent each element (for example, 64-bit data for double precision floating point numbers, and 32-bit data for single precision floating point numbers). In the application of alignment between images to accurately obtain the amount of position gap between images, it is important to obtain a normalized cross power spectrum as a complex sine wave with as little error as possible and obtain the period of the complex sine wave with accuracy. On the other hand, in the application of determining whether two images are identical or not as in the example embodiment of the present invention, it is not necessary to accurately calculate a normalized cross power spectrum as a complex sine wave. That is to say, it is important whether a normalized cross power spectrum has a distribution as periodic data with repetition. Even if each element of a normalized cross power spectrum is quantized into binary or ternary data and the amount of information of each element is reduced, it is possible to determine whether obtained data distribution is distribution as a periodic repetition pattern. Therefore, even if the information is reduced, the accuracy of matching and identification does not deteriorate extremely. Based on this, in this example embodiment, the quantizing unit 122 quantizes each element of a normalized cross power spectrum obtained by the synthesizing unit 121 into binary or ternary data.

Figure 11:
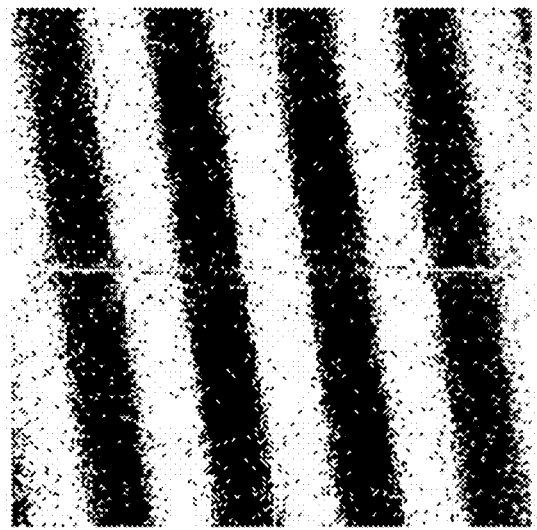
FIG. 11 is a view showing an example of an image in which the normalized cross power spectrum of the pair of identical images is quantized into binary data.

FIG. 11 shows an example of an image in which the normalized cross power spectrum R($k_1$, $k_2$) of a pair of identical images is quantized into binary data. Thus, in the data obtained by quantizing the normalized cross power spectrum of a pair of identical images into binary data, the pattern of a wave having a single period in which a light portion is regarded as a peak and a dark portion is regarded as a trough can be kept. Therefore, even if a normalized cross power spectrum that is real number data represented by 32-bit or 64-bit conventionally is quantized into binary (1-bit) or ternary (2-bit) data to reduce the amount of data, it is possible to determine the presence or absence of a correlation between input images without lowering accuracy. That is to say, it is possible to realize distinguishing a pair of identical images having a correlation from a pair of different images having no correlation with less data amount without impairing accuracy.

Next, the square wave determining unit 105 will be described in detail. As mentioned before, the square wave determining unit 105 quantifies a degree that a normalized cross power spectrum with elements quantized into binary or ternary values calculated by the frequency feature synthesizing unit 104 is a square wave having a single period, and outputs as a score.

Example 1 of Square Wave Determining Unit 105

Figure 12:
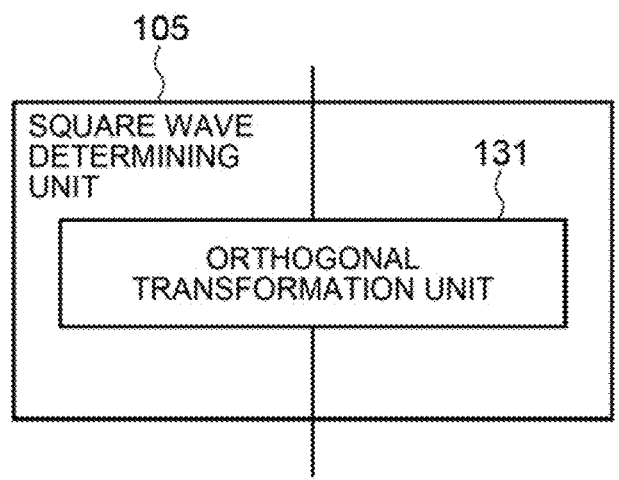
FIG. 12 is a block diagram showing an example of a square wave determining unit in the image matching apparatus according to the first example embodiment of the present invention.

FIG. 12 is a block diagram showing an example of the square wave determining unit 105. The square wave determining unit 105 in this example includes, for example, an orthogonal transformation unit 131 that performs orthogonal transformation using a Hadamard matrix. A Hadamard matrix is a square matrix whose elements are "+1" and "−1" and whose rows are mutually orthogonal. Considering a case where a Hadamard matrix $H_m$ is an m×m matrix and m=$2^P$ (P is a positive integer), the iladarnard matrix $H_m$ is defined as Equations 10 and 11 of FIG. 13.

The orthogonal transformation unit 131 is configured to perform orthogonal transformation using a Hadamard matrix on a normalized cross power spectrum quantized into binary or ternary values and output the maximum value of the output as a score. In a case where the quantized normalized cross power spectrum is a square wave having a single period, a sharp peak value of the period appears in the output by the orthogonal transformation unit 131. On the other hand, in a case where the quantized normalized cross power spectrum is not a square wave having a single period, a sharp peak value does not appear in the output by the orthogonal transformation unit 131. Therefore, the maximum value of the output by the orthogonal transformation unit 131 can be a score indicating a degree that the quantized normalized cross power spectrum is a square wave having a single period. The orthogonal transformation unit 131 matches images against each other based on the calculated score.

Figure 14:
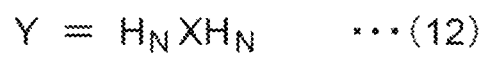

The orthogonal transformation using the Hadamard matrix performed by the orthogonal transformation unit 131 is described by Equation 12 of FIG. 14. In Equation 12, $H_N$ denotes a Hadamard matrix, X denotes an N×N input signal (quantized cross power spectrum), and Y denotes an N×N output signal (score). In the case of a normalized cross power spectrum quantized into binary values ("+1" and "−1"), the operation of Equation 12 can be executed by logical operation such as exclusive OR (XOR), bit counting, and a combination of addition and subtraction, so that high-speed processing is possible. Moreover, in the case of a normalized cross power spectrum quantized into ternary values ("+1", "0", and "−1"), the operation of Equation 12 can be executed by logical operation such as exclusive OR (XOR), bit counting, and a combination of addition and subtraction on the elements "+1" and "−1" without executing the operation on the elements having a value of "0", so that high-speed processing is possible.

Example 2 of Square Wave Determining Unit 105

Figure 15:
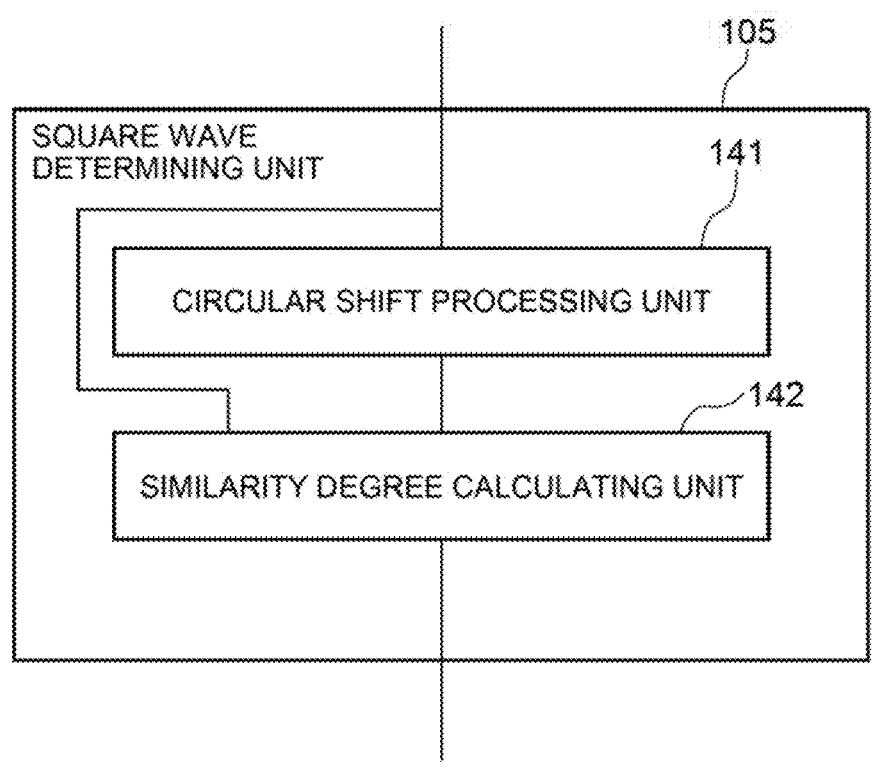
FIG. 15 is a block diagram showing another example of the square wave determining unit in the image matching apparatus according to the first example embodiment of the present invention.

FIG. 15 is a block diagram showing another example of the square wave determining unit 105. The square wave determining unit 105 of this example includes a circular shift processing unit 141 and a similarity degree calculating unit 142.

The circular shift processing unit 141 is configured to input a normalized cross power spectrum with elements quantized into binary or ternary values (hereinafter referred to as data before circular shift) and output a quantized cross power spectrum with the elements circularly shifted by a rotate no carry operation or the like (hereinafter referred to as data after circular shift). Moreover, the circular shift processing unit 141 is configured to variously change a circular shift amount and thereby output a plurality of data after circular shift having different circular shift amounts.

The similarity degree calculating unit 142 is configured to input data before circular shift and a plurality of data after circular shift with different circular shift amounts, and calculate a plurality of similarity degrees between the data before circular shift and the plurality of data after circular shift. Moreover, the similarity degree calculating unit 142 is configured to output the maximum similarity degree among the calculated similarity degrees as a score. The similarity degree calculating unit 142 performs image matching based on the calculated score.

In a case where the data before circular shift is a square wave having a single period, when the circular shift processing unit 141 circularly shifts the data before circular shift, a square wave having the same single period as the data before circular shift periodically appears as the data after circular shift. On the other hand, in a case where the data before circular shift is not a square wave having a single period, even when the circular shift processing unit 141 circularly shifts the data before circular shift with various shift amounts, data after circular shift having the same pattern as the data before circular shift does not appear. Therefore, by repeatedly performing the calculation of the similarity degree between the data before circular shift and the data after circular shift while changing the circular shift amount, and using the maximum value of the similarity degree as a score, it is possible to calculate a score representing a degree that the quantized cross power spectrum is a square wave having a single period.

The abovementioned circular shift processing unit 141 can be implemented by a bit shift operation. Moreover, the abovementioned similarity degree calculating unit 142 can be implemented by exclusive OR (XOR) and bit count operation for calculating the Hamming distance between the data before circular shift and the data after circular shift. Therefore, a faster calculation than the autocorrelation operation on real number data is possible.

Example 3 of Square Wave Determining Unit 105

Figure 16:
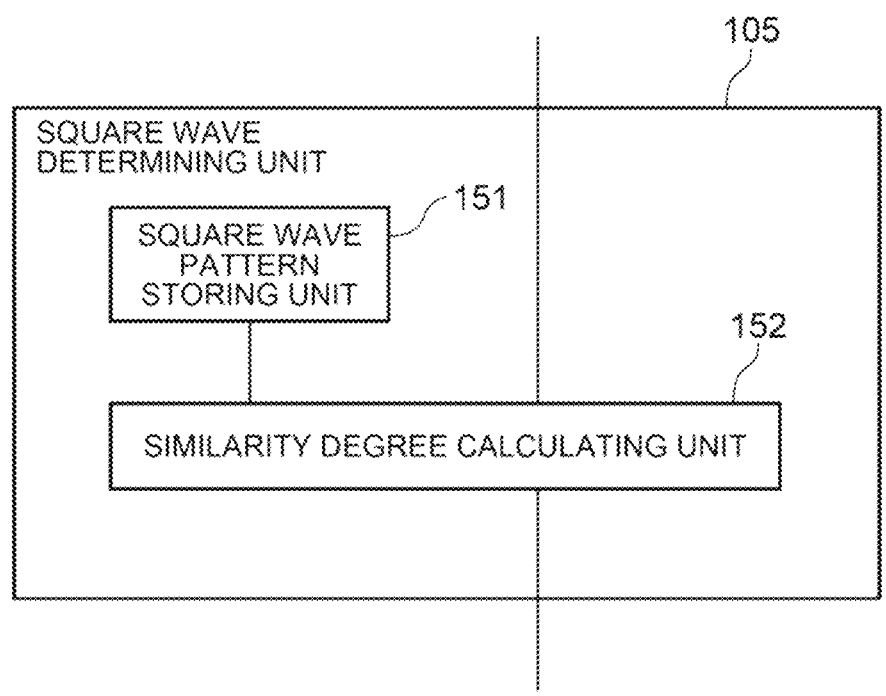
FIG. 16 is a block diagram showing still another example of the square wave determining unit in the image matching apparatus according to the first example embodiment of the present invention.

FIG. 16 is a block diagram showing still another example of the square wave determining unit 105. The square wave determining unit 105 of this example includes a square wave pattern storing unit 151 and a similarity degree calculating unit 152.

The square wave pattern storing unit 151 is configured to store a plurality of reference square wave patterns. A certain one of the reference square wave patterns is a quantized cross power spectrum obtained by quantizing each element of a normalized cross power spectrum of a pair of identical images with a position gap amount of certain value into a binary or ternary value. The plurality of reference square wave patterns stored in the square wave pattern storing unit 151 differ from each other in position gap amount.

The similarity degree calculating unit 152 is configured to input a normalized cross power spectrum with elements quantized into binary or ternary values (hereinafter, referred to as a compared square wave pattern) from the frequency feature synthesizing unit 104. Moreover, the similarity degree calculating unit 152 is configured to input a plurality of reference square wave patterns from the square wave pattern storing unit 151. Moreover, the similarity degree calculating unit 152 is configured to calculate a plurality of similarity degrees between the input compared square waved pattern and the plurality of reference square wave patterns, and output the maximum similarity degree among the plurality of similarity degrees as a score. The similarity degree between the compared square wave pattern and the reference square wave pattern can be obtained by Hamming distance calculation, for example. The similarity degree calculating unit 152 performs image matching based on the calculated score.

In the case of a pair of identical individuals, that is, in a case where the input two images have a correlation, the normalized cross power spectrum becomes a square wave pattern having a single period, and its period corresponds to the amount of position gap between the two images. Therefore, by finding the range of the repetition error of the amount of position gap at the time of shooting, it is possible to infer the pattern of the square wave arising when there is a correlation. Such a pattern is stored in advance as the reference square wave pattern into the square wave pattern storing unit 151, and the similarity degree calculating unit 152 calculates the Hamming distance from the compared square wave pattern, calculates a score representing that the compared square wave pattern is a square wave having a single period based on the distance, and performs the determination.

As described above, according to this example embodiment, it is possible to match the first image against the second image at high speeds. The reason is that a normalized cross power spectrum of the frequency feature of the first image and the frequency feature of the second image is quantized, a score representing a degree that the quantized cross power spectrum is a square wave having a single period is calculated, and the first image and the second image are matched against each other based on the score. That is to say, according to this example embodiment, the quantizing unit 122 quantizes each element of the normalized cross power spectrum obtained by the synthesizing unit 121 into binary or ternary data, so that it is possible to largely reduce the amount of data processed by the square wave determining unit 105 as compared with the method described in Non-Patent Document 1, that is, the method of determining whether a normalized cross power spectrum is a complex sine wave having a single period without quantizing the normalized cross power spectrum. It is needless to say that it is possible to reduce the amount of operation necessary for the determination by replacing the similarity degree calculation using the inverse Fourier transform requiring a large amount of calculation as described in Patent Document 1 and Patent Document 2 with the similarity degree calculation process including logical operation such as exclusive OR (XOR) and addition requiring a small amount of calculation.

Modified Example of this Example Embodiment

In this example embodiment, the frequency feature synthesizing unit 104 calculates a quantized cross power spectrum by quantizing each element of a normalized cross power spectrum of the frequency feature of the first image and the frequency feature of the second image into binary or ternary data. However, even if, after calculation of the cross power spectrum of the frequency feature of the first image and the frequency feature of the second image, the sines (+, −) of the respective elements of the cross power spectrum are converted to "+1, −1" or "+1, 0, −1" without normalizing with amplitude components, the same quantized cross power spectrum as described above can be calculated. Therefore, the frequency feature synthesizing unit 104 may be configured to calculate the cross power spectrum of the frequency feature of the first image and the frequency feature of the second image and thereafter quantize into binary or ternary values based on the sign (+, −) of at least one of the real part and the imaginary part of each of the elements.

Second Example Embodiment

The first example embodiment has a configuration to perform image matching by using data obtained by quantizing a normalized cross power spectrum obtained by synthesizing the frequency feature of the first image and the frequency feature of the second image into binary or ternary values. On the other hand, this example embodiment has a configuration to quantize the real parts and the imaginary parts of the elements of each of the frequency feature of the first image and the frequency feature of the second image into binary values, and thereafter synthesize the quantized frequency features, and thereby generate a quantized cross power spectrum with the elements represented by ternary values. Moreover, likewise the first example embodiment, this example embodiment has a configuration to calculate a score indicating a degree that the quantized cross power spectrum with the elements represented by ternary values is a square wave having a single period, and match the first image against the second image based on the score. According to this example embodiment, it is possible to largely reduce the data size of the feature values by quantization, and it is possible to process the matching at high speeds.

This example embodiment is different from the first example embodiment in the configuration and operation of the frequency feature synthesizing unit 104, and otherwise the same as the first example embodiment. Below, the configuration and operation of the frequency feature synthesizing unit 104 in this example embodiment will be described.

Figure 17:
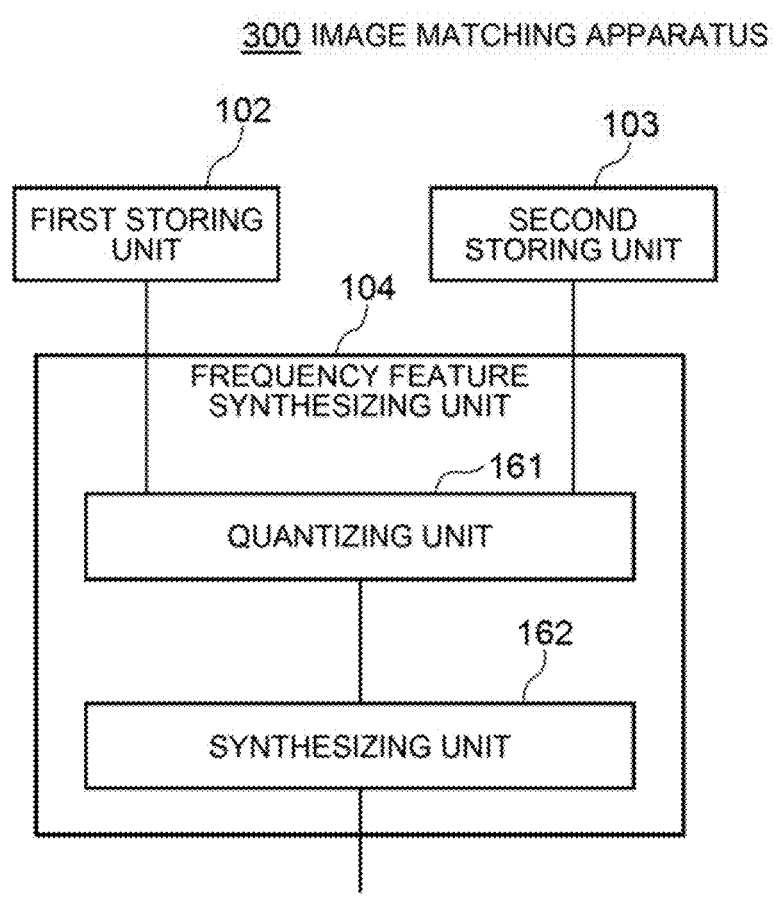
FIG. 17 is a block diagram showing a configuration example of a frequency feature synthesizing unit in an image matching apparatus according to a second example embodiment of the present invention.

FIG. 17 is a block diagram showing an example of the frequency feature synthesizing unit 104 of an image matching apparatus 300 according to this example embodiment. The frequency feature synthesizing unit 104 in this example includes a quantizing unit 161 and a synthesizing unit 162.

The quantizing unit 161 is configured to quantize data of the real parts and the imaginary parts of the elements of the frequency feature of the first image stored in the first storing unit 102 into binary data. Moreover, the quantizing unit 161 is configured to quantize data of the real parts and the imaginary parts of the elements of the frequency feature of the second image stored in the second storing unit 103 into binary data. The quantizing unit 161 quantizes, for example, into binary data of "+1" and "−1" based on phase information of the respective elements of the frequency features.

Figure 18:
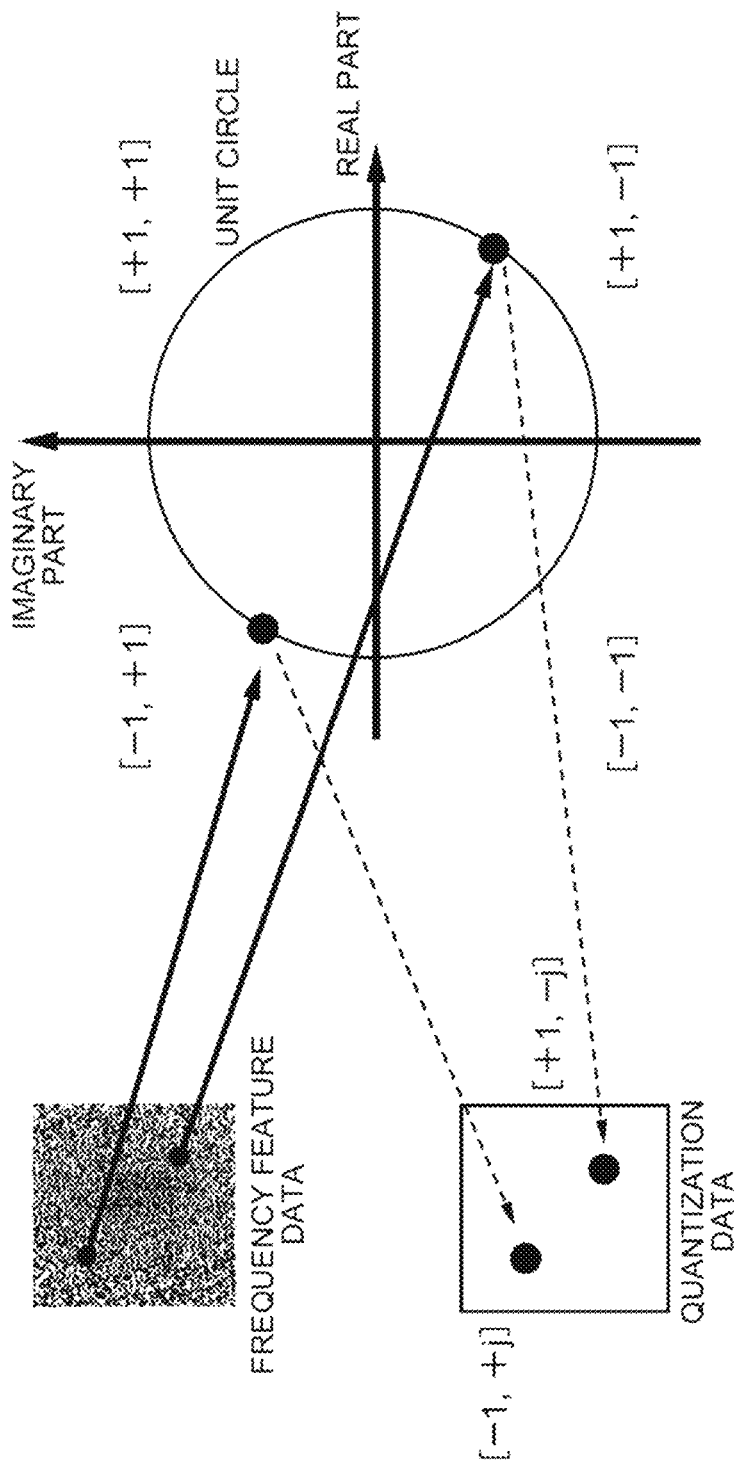
FIG. 18 is a conceptual view showing an example of an operation of quantizing each of a real part and an imaginary part of an element of a frequency feature.

FIG. 18 is a conceptual view showing an example of an operation of quantizing each of the real part and the imaginary part of an element of a frequency feature. A complex number α of each element of a frequency feature can be represented by α=A+jB, where an imaginary unit is j and real numbers are A and B. The quantizing unit 161 quantizes by transforming the real numbers A and B into "+1" or "−1" based on the signs of the real numbers A and B and whether or not the real numbers A and B are 0. For example, thee quantizing unit 161 transforms a complex number α where A<0 and B≥0 into [−1, +j]. Moreover, the quantizing unit 161 transforms a complex number α where A≥0 and B<0 into [+1, −j].

The synthesizing unit 162 obtains a cross power spectrum that is the product for each element of the frequency feature of the first image and the complex conjugate of the frequency feature of the second image quantized by the quantizing unit 161. Herein, the frequency feature of the first image and the frequency feature of the second image are data in which the real numbers of the real part and the imaginary part have either of two values of "+1" and "−1". Therefore, the synthesizing unit 162 can process at high speeds by a logical operation or the like. Moreover, in the product for each element of the frequency feature of the first image and the complex conjugate of the frequency feature of the second image, the real numbers of the real part and the imaginary part become any of three values of "+2", "0", and "−2". The synthesizing unit 162 outputs at least one of the real part and the imaginary part of the quantized cross power spectrum, as a synthesized frequency feature. For example, the synthesizing unit 162 outputs data obtained by substituting the value of each of the elements of the quantized cross power spectrum with the value of the real part of the element, as a quantized cross power spectrum. Alternatively, the synthesizing unit 162 outputs data obtained by substituting the value of each of the elements of the quantized cross power spectrum with the value of the imaginary part of the element, as a quantized cross power spectrum. The synthesizing unit 162 may be configured to output data obtained by transforming the values "+2" and "−2" of the respective elements of the quantized cross power spectrum into "+1" and "−1", as a quantized cross power spectrum.

The square wave determining unit 105 in the latter stage quantifies a degree of being a square wave having a single period based on the synthesized frequency feature data quantized into three values and output by the synthesizing unit 162, and outputs as a score. Since the specific processing is the same as described above, a description thereof will be omitted herein.

Thus, according to this example embodiment, it is possible to match the first image against the second image at high speeds. The reason is that a cross power spectrum is calculated by synthesizing after quantizing the real parts and imaginary parts of elements of the frequency feature of a first image and the frequency feature of a second image into binary values, and then a score representing a degree that the quantized cross power spectrum is a square wave having a single period is calculated, and the first image and the second image are matched against each other based on the score. In particular, this example embodiment has an advantage that the feature value data size can be significantly reduced by quantization as compared with the first example embodiment.

Modified Example of this Example Embodiment

Figure 19:
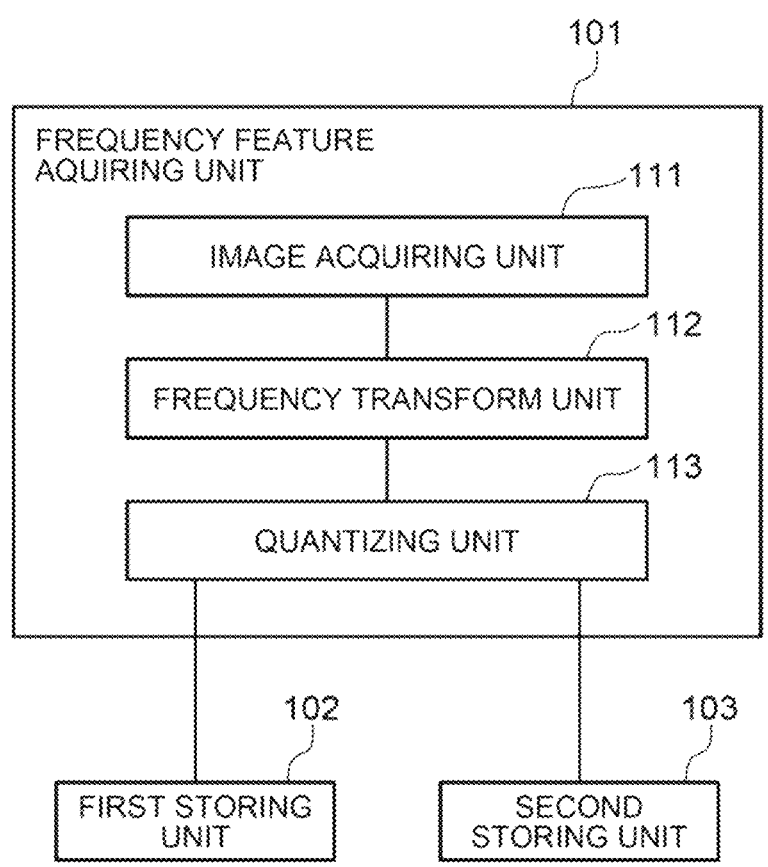
FIG. 19 is a block diagram showing a configuration example of a frequency feature synthesizing unit in a modified example of the image matching apparatus according to the second example embodiment of the present invention.

In this example embodiment, the quantizing unit 161 included by the frequency feature synthesizing unit 104 performs quantization of the frequency feature of the first image and the frequency feature of the second image acquired by the frequency feature acquiring unit 101. However, a quantizing unit 113 having the same function as the quantizing unit 161 included by the frequency feature synthesizing unit 104 may be included by the frequency feature acquiring unit 101 as shown in FIG. 19. The quantizing unit 113 is configured to quantize the real parts and imaginary parts of the respective elements of the frequency feature of the first image and the frequency feature of the second image generated by the frequency transform unit 112 of the frequency feature acquiring unit 101 into binary values, and store the quantized frequency feature of the first image and the quantized frequency feature of the second image into the first storing unit 102 and the second storing unit 103, respectively. In this modified example, the synthesizing unit 162 of the frequency feature synthesizing unit 104 is configured to retrieve the quantized frequency feature of the first image and the quantized frequency feature of the second image from the first storing unit 102 and the second storing unit 103, respectively.

Third Example Embodiment

Next, an image matching apparatus according to a third example embodiment of the present invention will be described. An image matching apparatus 400 according to this example embodiment is different in the frequency feature acquiring unit 101 from the image matching apparatuses according to the first and second example embodiments, and otherwise the same as the image matching apparatuses according to the first and second example embodiments.

Figure 20:
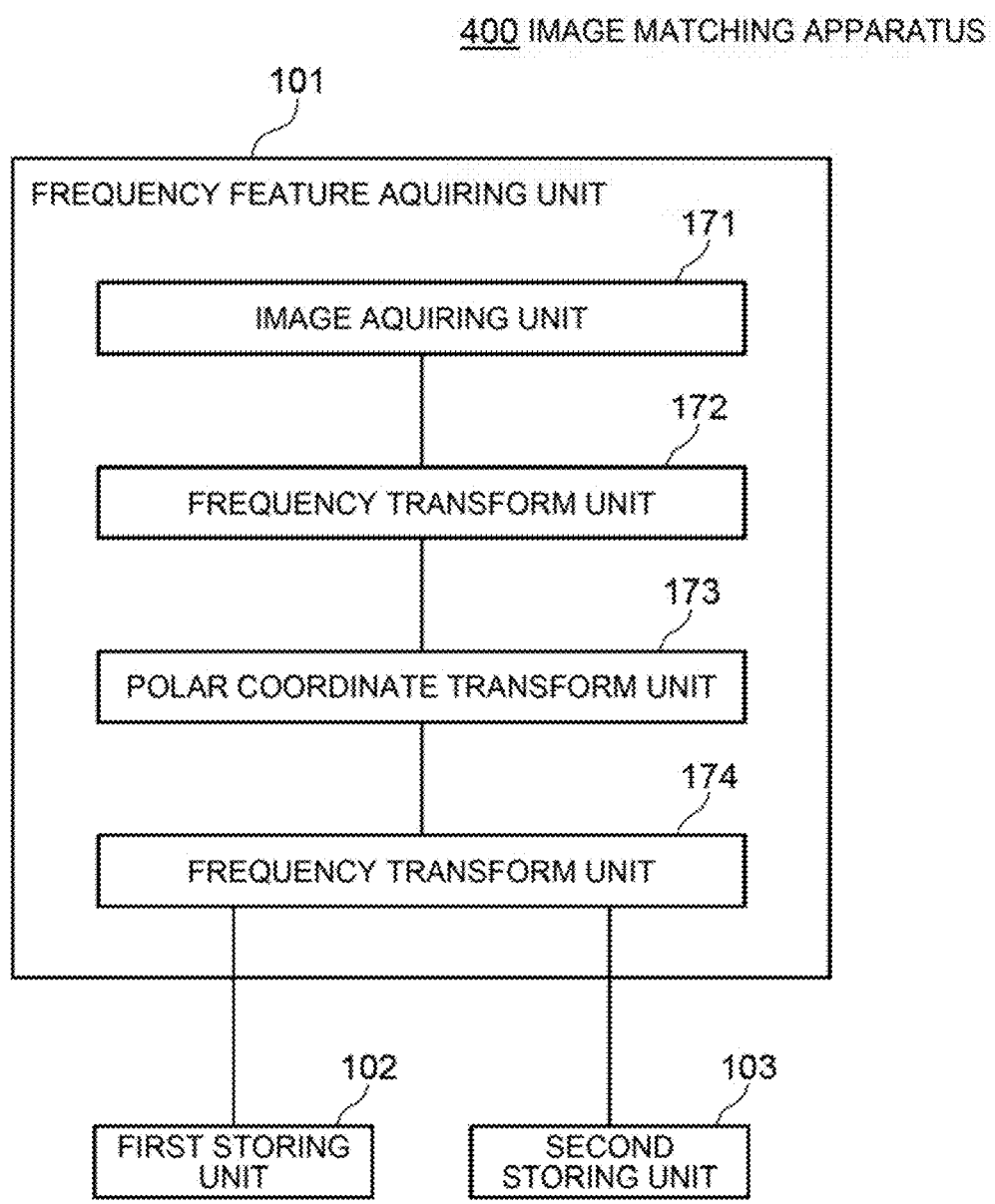
FIG. 20 is a block diagram showing a configuration example of a frequency feature synthesizing unit in an image matching apparatus according to a third example embodiment of the present invention.

FIG. 20 is a block diagram of the frequency feature acquiring unit 101 in the image matching apparatus 400 according to this example embodiment. The frequency feature acquiring unit 101 in this example includes an image acquiring unit 171, a frequency transform unit 172, a polar coordinate transform unit 173, and a frequency transform unit 174.

The image acquiring unit 171 is configured to acquire the first image and the second image in the same manner as the image acquiring unit 111 shown in FIG. 4.

The frequency transform unit 172 is configured to receive the first image and the second image from the image acquiring unit 172, apply the discrete Fourier transform to each of the images, and calculate a two-dimensional amplitude spectrum from the result. This two-dimensional amplitude spectrum is invariant to the translation of the original image.

The polar coordinate transform unit 173 is configured to receive the two-dimensional amplitude spectrum of the first image and the two-dimensional amplitude spectrum of the second image from the frequency transform unit 172, apply polar coordinate transform or log polar coordinate transform to the amplitude spectrums, and calculate polar coordinate images. The polar coordinate image is referred to as a Fourier-Mellin feature image. Changes in magnification and rotation of the original image are transformed into changes in translation in the Fourier-Mellin feature image.

The frequency transform unit 174 is configured to receive the Fourier-Mellin feature image of the first image and the Fourier-Mellin feature image of the second image from the polar coordinate transform unit 173, apply the discrete Fourier transform to the Fourier-Mellin transform images, and thereby calculate phase images. The phase image is referred to as a Fourier-Mellin frequency spectrum image. The Fourier-Mellin frequency spectrum image is invariant to the magnification, rotation, and translation of the original image. The frequency transform unit 174 stores the Fourier-Mellin frequency spectrum image of the first image into the first storing unit 102, and stores the Fourier-Mellin frequency spectrum image of the second image into the second storing unit 103.

For the same reason as the image matching apparatuses according to the first and second example embodiment, the image matching apparatus 400 according to this example embodiment can perform match of the first image and the second image at high speeds. Moreover, it is possible to perform the matching robustly against the magnification, rotation, and translation of the first and second images.

In an environment where there is no position gap between the first image and the second image in terms of magnification and rotation, the polar coordinate transform unit 173 in FIG. 20 may be omitted. In an image matching apparatus in which the polar coordinate transform unit 173 is omitted, the frequency transform unit 174 is configured to receive the two-dimensional amplitude spectrum of the first image and the two-dimensional amplitude spectrum of the second image from the frequency transform unit 172, and store the phase images obtained by applying the discrete Fourier transform to the two-dimensional spectrums into the first storing unit 102 and the second storing unit 103, respectively.

Fourth Example Embodiment

Next, an image matching apparatus according to a fourth example embodiment of the present invention will be described. The image matching apparatuses according to the first to third example embodiments described above use the inside of the region of the frequency feature of the first image and the inside of the region of the frequency feature of the second image for matching without discrimination. On the other hand, the image matching apparatus according to this example embodiment uses the inside of the region of the frequency feature of the first image and the inside of the region of the frequency feature of the second image for matching with discrimination. To be specific, the image matching apparatus divides the region of a frequency feature into a plurality of partial regions, and sets the effectiveness of a partial region that adversely affects matching to be lower than that of the other partial region or does not use such a partial region, thereby reducing an influence on matching.

Figure 21:
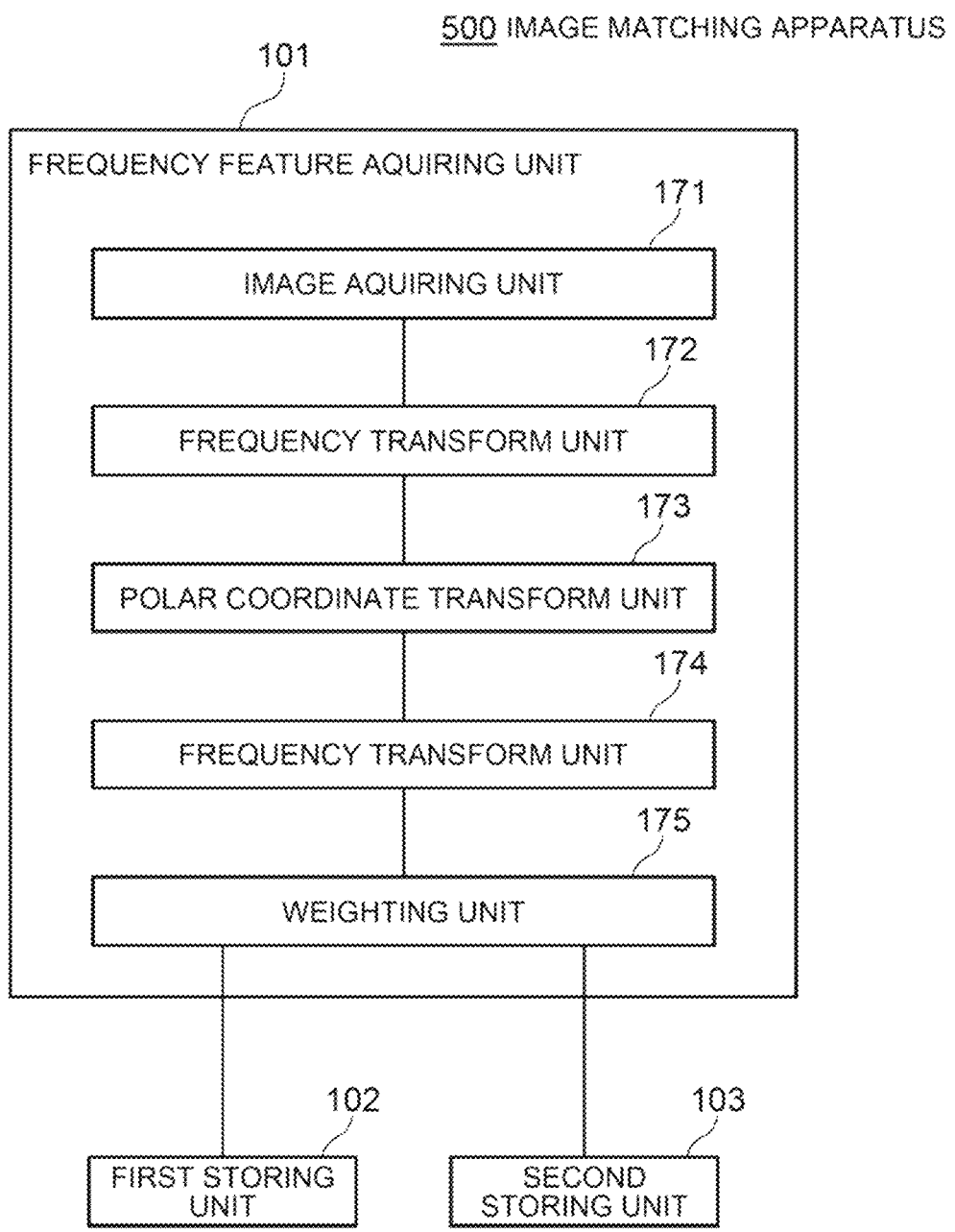
FIG. 21 is a block diagram showing a configuration example of a frequency feature synthesizing unit in an image matching apparatus according to a fourth example embodiment of the present invention.

FIG. 21 is a block diagram of the frequency feature acquiring unit 101 in an image matching apparatus 500 according to this example embodiment. The frequency feature acquiring unit 101 in this example has a configuration in which a weighting unit 175 is added to the frequency feature acquiring unit 101 shown in FIG. 20.

The weighting unit 175 is configured to receive a first frequency feature and a second frequency feature from the frequency transform unit 174, and assign a weight to each partial region thereof. Herein, one element of a frequency feature may be one partial region, or a set of adjacent elements may be one partial region. The weights to be assigned may take, for example, values from 0 to 1, and may have a lower effectiveness degree as is closer to 0.

A criterion for assigning a weight to a partial region is set in advance. For example, in a case where existence of a frequency band important for matching is found by a statistical method, a criterion to assign a larger weight to a partial region corresponding to the frequency band important for matching than to the other partial regions may be used. Alternatively, in a case where existence of an image component common to a number of images is found by a statistical method, a criterion to assign a smaller weight to a partial region containing the common image component than to the other partial regions may be used. For example, in a case where an image component common to a plurality of registered images exists, when the same image component exists in a compared image, a difference between a score indicating a degree of similarity between a compared image and a registered image relating to identical individuals and a score indicating a degree of similarity between a compared image and a registered image relating to different individuals becomes small due to an influence of the common image component. By using the criteria to assign a smaller weight to the partial region containing the common image component than to the other partial regions as described above, it is possible to prevent decrease of the accuracy of individual identification.

As a method to handle the first frequency feature and the second frequency feature weighted for each partial region later, there are a plurality of methods as illustrated below.

One method that can be considered is that the frequency feature synthesizing unit 104 removes a partial region with the assigned weight equal to or less than a reference value and calculates a normalized cross power spectrum of the first frequency feature and the second frequency feature composed of the remaining partial regions.

Another method is as follows. First, the frequency feature synthesizing unit 104 calculates a quantized normalized cross power spectrum obtained by assigning, to the product of an element of the first frequency feature and an element of the complex conjugate of the second frequency feature, a weight corresponding to weights assigned to the original elements (for example, a value obtained by multiplying both the weights). Next, when calculating a score indicating a degree that the quantized normalized cross power spectrum is a square wave having a single period, the square wave determining unit 105 considers the weight assigned to an element of the normalized cross power spectrum.

Thus, the image matching apparatus 500 according to this example embodiment can match the first image against the second image at high speeds for the same reason as the image matching apparatuses of the first to third example embodiments. Moreover, even if the first image and the second image contain a partial region that adversely effects matching, it is possible to reduce an influence on the matching.

Fifth Example Embodiment

Figure 22:
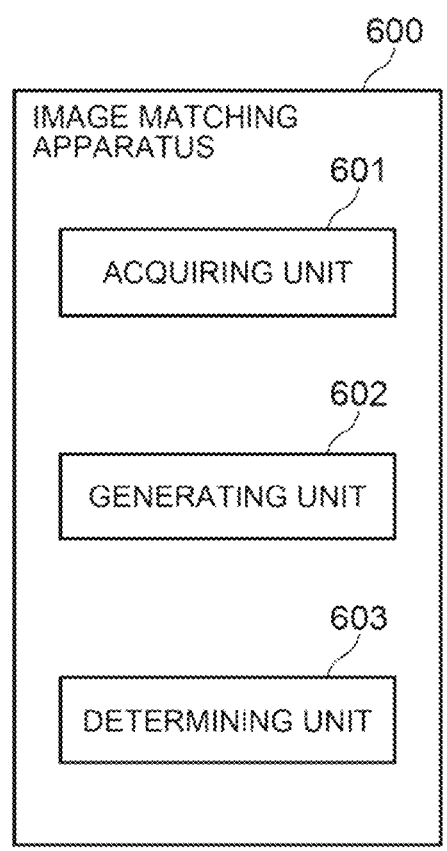
FIG. 22 is a block diagram of an image matching apparatus according to a fifth example embodiment of the present invention.

Next, an image matching apparatus according to a fifth example embodiment of the present invention will be described. FIG. 22 is a block diagram of an image matching apparatus 600 according to this example embodiment.

Referring to FIG. 22, the image matching apparatus 600 is configured to match the first image against the second image. The image matching apparatus 600 includes an acquiring unit 601, a generating unit 602, and a determining unit 603.

The acquiring unit 601 is configured to acquire a frequency feature of the first image and a frequency feature of the second image. The acquiring unit 601 can be configured in the same manner as the frequency feature acquiring unit 101 of FIG. 1, but is not limited thereto.

The generating unit 602 is configured to synthesize the frequency feature of the first image and the frequency feature of the second image acquired by the acquiring unit 601, and generate a quantized synthesized frequency feature in which the value of an element is expressed by a binary value or a ternary value. The generating unit 602 can be configured in the same manner as the frequency feature synthesizing unit 104 of FIG. 4, but is not limited thereto.

The determining unit 603 is configured to calculate a score indicating a degree that the quantized synthesized frequency feature generated by the generating unit 602 is a square wave having a single period, and match the first image against the second image based on the score. The determining unit 603 can be configured in the same manner as the square wave determining unit 105 of FIG. 1, but is not limited thereto.

The image matching apparatus 600 according to this example embodiment thus configured operates in the following manner. First, the acquiring unit 601 acquires the frequency feature of the first image and the frequency feature of the second image. Next, the generating unit 602 synthesizes the frequency feature of the first image and the frequency feature of the second image acquired by the acquiring unit 601, and generates a quantized synthesized frequency feature in which the value of each element is represented by a binary value or a ternary value. Next, the determining unit 603 calculates a score indicating a degree that the quantized synthesized frequency feature generated by the generating unit 602 is a square wave having a single period, and matches the first image against the second image based on the score.

The present invention has been described above with reference to the example embodiments, but is not limited to the example embodiments. The configurations and details of the present invention can be changed in various manners that can be understood by one skilled in the art within the scope of the present invention.

The present invention can be used in the field of matching two images against each other and in particular, the present invention can be used in the field of performing individual identification and management of each product by acquiring a difference in naturally occurring minute pattern arising in the same production process, such as minute irregularities and patterns on the product surface, and a random pattern on the material surface, as an image with an imaging device such as a camera, and recognizing the minute pattern. Moreover, the present invention can be used not only for products, but also in the field of individual authentication or identification and management of a living body by acquiring a difference in surface fine pattern of living things such as human fingerprints as an image with an imaging device such as a camera and recognizing the fine pattern.

The whole or part of the example embodiments disclosed above can be described as, but not limited to, the following supplementary notes.

[Supplementary Note 1]

An image matching apparatus matching a first image against a second image, the image matching apparatus comprising:
  an acquiring unit configured to acquire a frequency feature of the first image and a frequency feature of the second image;
  a generating unit configured to synthesize the frequency feature of the first image and the frequency feature of the second image, and generate a quantized synthesized frequency feature in which a value of an element is represented by a binary value or a ternary value; and
  a determining unit configured to calculate a score indicating a degree to which the quantized synthesized frequency feature is a square wave having a single period, and match the first image against the second image based on the score.

[Supplementary Note 2]

The image matching apparatus according to Supplementary Note 1, wherein the generating unit includes:
  a synthesizing unit configured to synthesize the frequency feature of the first image and the frequency feature of the second image, and generate a synthesized frequency feature; and
  a quantizing unit configured to transform a value of an element of the synthesized frequency feature generated by the synthesizing unit into a binary value or a ternary value.

[Supplementary Note 3]

The image matching apparatus according to Supplementary Note 2, wherein the quantizing unit is configured to transform the value of the element into a binary value or a ternary value based on a sign of a real part of the element.

[Supplementary Note 4]

The image matching apparatus according to Supplementary Note 2, wherein the quantizing unit is configured to transform the value of the element into a binary value or a ternary value based on a sign of an imaginary part of the element.

[Supplementary Note 5]

The image matching apparatus according to Supplementary Note 1, wherein the generating unit includes:
  a quantizing unit configured to generate a first quantized frequency feature and a second quantized frequency feature obtained by transforming values of real parts and imaginary parts of elements of the frequency feature of the first image and the frequency feature of the second image into binary values; and a synthesizing unit configured to synthesize the first quantized frequency feature and the second quantized frequency feature, and generate a quantized synthesized frequency feature in which a value of an element is represented by a ternary value.

[Supplementary Note 6]

The image matching apparatus according to Supplementary Note 5, wherein the quantizing unit is configured to transform the values of the real parts and the imaginary parts of the elements into binary values based on signs of the real parts and the imaginary parts of the elements.

[Supplementary Note 7]

The image matching apparatus according to any of Supplementary Notes 1 to 6, wherein the determining unit is configured to perform orthogonal transformation using a Hadamard matrix on the quantized synthesized frequency feature, and calculate the score based on data obtained by the orthogonal transformation.

[Supplementary Note 8]

The image matching apparatus according to any of Supplementary Notes 1 to 6, wherein the determining unit is configured to calculate the score based on a maximum value of degrees of similarity between a plurality of post-shift quantized synthesized frequency features and the quantized synthesized frequency feature before circular shift, the plurality of post-shift quantized synthesized frequency features being obtained by performing the circular shift on the quantized synthesized frequency feature by different circular shift amounts, respectively.

[Supplementary Note 9]

The image matching apparatus according to any of Supplementary Notes 1 to 6, wherein the determining unit is configured to calculate the score based on a maximum value of degrees of similarity between a plurality of reference quantized synthesized frequency features having different periods, respectively, and the quantized synthesized frequency feature.

[Supplementary Note 10]

The image matching apparatus according to any of Supplementary Notes 1 to 9, wherein the acquiring unit is configured to divide the frequency feature of the first image and the frequency feature of the second image into a plurality of partial regions, and assign a degree of effectiveness relating to calculation of the score to each of the partial regions.

[Supplementary Note 11]

An image matching method for matching a first image against a second image, the image matching method comprising:

acquiring a frequency feature of the first image and a frequency feature of the second image;

synthesizing the frequency feature of the first image and the frequency feature of the second image, and generating a quantized synthesized frequency feature in which a value of an element is represented by a binary value or a ternary value; and calculating a score indicating a degree to which the quantized synthesized frequency feature is a square wave having a single period, and matching the first image against the second image based on the score.

[Supplementary Note 12]

The image matching method according to Supplementary Note 11, wherein the generating includes:

synthesizing the frequency feature of the first image and the frequency feature of the second image, and generating a synthesized frequency feature; and transforming a value of an element of the generated synthesized frequency feature into a binary value or a ternary value.

[Supplementary Note 13]

The image matching method according to Supplementary Note 12, wherein the transforming includes transforming the value of the element into a binary value or a ternary value based on a sign of a real part of the element.

[Supplementary Note 14]

The image matching method according to Supplementary Note 12, wherein the transforming includes transforming the value of the element into a binary value or a ternary value based on a sign of an imaginary part of the element.

[Supplementary Note 15]

The image matching method according to Supplementary Note 11, wherein the generating includes:

generating a first quantized frequency feature and a second quantized frequency feature obtained by transforming values of real parts and imaginary parts of elements of the frequency feature of the first image and the frequency feature of the second image into binary values; and synthesizing the first quantized frequency feature and the second quantized frequency feature, and generating a quantized synthesized frequency feature in which a value of an element is represented by a ternary value.

[Supplementary Note 16]

The image matching method according to Supplementary Note 15, wherein the generating the first quantized frequency feature and the second quantized frequency feature includes transforming the values of the real parts and the imaginary parts of the elements into binary values based on signs of the real parts and the imaginary parts of the elements.

[Supplementary Note 17]

The image matching method according to any of Supplementary Notes 11 to 16, wherein the calculating the score includes performing orthogonal transformation using a Hadamard matrix on the quantized synthesized frequency feature, and calculating the score based on data obtained by the orthogonal transformation.

[Supplementary Note 18]

The image matching method according to any of Supplementary Notes 11 to 16, wherein the calculating the score includes calculating the score based on a maximum value of degrees of similarity between a plurality of post-shift quantized synthesized frequency features and the quantized synthesized frequency feature before circular shift, the plurality of post-shift quantized synthesized frequency features being obtained by performing the circular shift on the quantized synthesized frequency feature by different circular shift amounts, respectively.

[Supplementary Note 19]

The image matching method according to any of Supplementary Notes 11 to 16, wherein the calculating the score includes calculating the score based on a maximum value of degrees of similarity between a plurality of reference quantized synthesized frequency features having different periods, respectively, and the quantized synthesized frequency feature.

[Supplementary Note 20]

The image matching method according to any of Supplementary Notes 11 to 19, wherein the acquiring includes dividing the frequency feature of the first image and the frequency feature of the second image into a plurality of partial regions, and assigning a degree of effectiveness relating to calculation of the score to each of the partial regions.

[Supplementary Note 21]

A non-transitory computer-readable recording medium with a computer program recorded, the computer program comprising instructions for causing a computer matching a first image against a second image to execute:
- a process of acquiring a frequency feature of the first image and a frequency feature of the second image;
- a process of synthesizing the frequency feature of the first image and the frequency feature of the second image, and generating a quantized synthesized frequency feature in which a value of an element is represented by a binary value or a ternary value; and
- a process of calculating a score indicating a degree to which the quantized synthesized frequency feature is a square wave having a single period, and matching the first image against the second image based on the score.

DESCRIPTION OF NUMERALS 100 image matching apparatus
101 frequency feature acquiring unit
102 first storing unit
103 second storing unit
104 frequency feature synthesizing unit
105 square wave determining unit
106 information presenting unit
111 image acquiring unit
112 frequency transform unit
121 synthesizing unit
122 quantizing unit
131 orthogonal transformation unit
141 circular shift processing unit
142 similarity degree calculating unit
151 square wave pattern storing unit
152 similarity degree calculating unit
161 quantizing unit
162 synthesizing unit
171 image acquiring unit
172 frequency transform unit
173 polar coordinate transform unit
174 frequency transform unit
175 weighting unit
200 information processing device
201 imaging unit
202 operation input unit
203 screen display unit
204 communication interface unit
205 storing unit
206 arithmetic processing unit
207 program
300 image matching apparatus
400 image matching apparatus
500 image matching apparatus
600 image matching apparatus
601 acquiring unit
602 generating unit
603 determining unit

What is claimed is:

1. An image matching apparatus matching a first image against a second image, the image matching apparatus comprising:
   a memory configured to store instructions; and
   a processor configured to execute the instructions to:
   acquire a frequency feature of the first image and a frequency feature of the second image;
   synthesize the frequency feature of the first image and the frequency feature of the second image;
   generate a quantized synthesized frequency feature in which a value of an element is represented by a binary value or a ternary value;
   calculate a score indicating a degree to which the quantized synthesized frequency feature is a square wave having a single period; and
   match the first image against the second image based on the score.

2. The image matching apparatus according to claim 1, wherein the processor is further configured to execute the instructions to:
   synthesize the frequency feature of the first image and the frequency feature of the second image;
   generate a synthesized frequency feature; and
   transform a value of an element of the synthesized frequency feature generated into a binary value or a ternary value.

3. The image matching apparatus according to claim 2, wherein the processor is further configured to execute the instructions to transform the value of the element into a binary value or a ternary value based on a sign of a real part of the element.

4. The image matching apparatus according to claim 2, wherein the processor is further configured to execute the instructions to transform the value of the element into a binary value or a ternary value based on a sign of an imaginary part of the element.

5. The image matching apparatus according to claim 1, wherein the processor is further configured to execute the instructions to:
   generate a first quantized frequency feature and a second quantized frequency feature obtained by transforming values of real parts and imaginary parts of elements of the frequency feature of the first image and the frequency feature of the second image into binary values;
   synthesize the first quantized frequency feature and the second quantized frequency feature; and
   generate a quantized synthesized frequency feature in which a value of an element is represented by a ternary value.

6. The image matching apparatus according to claim 5, wherein the processor is further configured to execute the instructions to transform the values of the real parts and the imaginary parts of the elements into binary values based on signs of the real parts and the imaginary parts of the elements.

7. The image matching apparatus according to claim 1, wherein the processor is further configured to execute the instructions to:
   perform orthogonal transformation using a Hadamard matrix on the quantized synthesized frequency feature; and
   calculate the score based on data obtained by the orthogonal transformation.

8. The image matching apparatus according to claim 1, wherein the processor is further configured to execute the instructions to calculate the score based on a maximum value of degrees of similarity between a plurality of post-shift quantized synthesized frequency features and the quantized synthesized frequency feature before circular shift, the plurality of post-shift quantized synthesized frequency features being obtained by performing the circular shift on the quantized synthesized frequency feature by different circular shift amounts, respectively.

9. The image matching apparatus according to claim 1, wherein the processor is further configured to execute the instructions to calculate the score based on a maximum value of degrees of similarity between a plurality of reference quantized synthesized frequency features having different periods, respectively, and the quantized synthesized frequency feature.

10. The image matching apparatus according to claim 1, wherein the processor is further configured to execute the instructions to:
   divide the frequency feature of the first image and the frequency feature of the second image into a plurality of partial regions; and
   assign a degree of effectiveness relating to calculation of the score to each of the partial regions.

11. An image matching method for matching a first image against a second image, the image matching method comprising:
   acquiring a frequency feature of the first image and a frequency feature of the second image;
   synthesizing the frequency feature of the first image and the frequency feature of the second image;
   generating a quantized synthesized frequency feature in which a value of an element is represented by a binary value or a ternary value;
   calculating a score indicating a degree to which the quantized synthesized frequency feature is a square wave having a single period; and
   matching the first image against the second image based on the score.

12. The image matching method according to claim 11, wherein the generating includes:
   synthesizing the frequency feature of the first image and the frequency feature of the second image;
   generating a synthesized frequency feature; and
   transforming a value of an element of the generated synthesized frequency feature into a binary value or a ternary value.

13. The image matching method according to claim 12, wherein the transforming includes transforming the value of the element into a binary value or a ternary value based on a sign of a real part of the element.

14. The image matching method according to claim 12, wherein the transforming includes transforming the value of the element into a binary value or a ternary value based on a sign of an imaginary part of the element.

15. The image matching method according to claim 11, wherein the generating includes:
   generating a first quantized frequency feature and a second quantized frequency feature obtained by transforming values of real parts and imaginary parts of elements of the frequency feature of the first image and the frequency feature of the second image into binary values;
   synthesizing the first quantized frequency feature and the second quantized frequency feature; and
   generating a quantized synthesized frequency feature in which a value of an element is represented by a ternary value.

16. The image matching method according to claim 15, wherein the generating the first quantized frequency feature and the second quantized frequency feature includes transforming the values of the real parts and the imaginary parts of the elements into binary values based on signs of the real parts and the imaginary parts of the elements.

17. The image matching method according to claim 11, wherein the calculating the score includes:
   performing orthogonal transformation using a Hadamard matrix on the quantized synthesized frequency feature; and
   calculating the score based on data obtained by the orthogonal transformation.

18. The image matching method according to claim 11, wherein the calculating the score includes calculating the score based on a maximum value of degrees of similarity between a plurality of post-shift quantized synthesized frequency features and the quantized synthesized frequency feature before circular shift, the plurality of post-shift quantized synthesized frequency features being obtained by performing the circular shift on the quantized synthesized frequency feature by different circular shift amounts, respectively.

19. The image matching method according to claim 11, wherein the calculating the score includes calculating the score based on a maximum value of degrees of similarity between a plurality of reference quantized synthesized frequency features having different periods, respectively, and the quantized synthesized frequency feature.

20. A non-transitory computer-readable recording medium with a computer program recorded, the computer program comprising instructions for causing a computer matching a first image against a second image to execute:
   a process of acquiring a frequency feature of the first image and a frequency feature of the second image;
   a process of synthesizing the frequency feature of the first image and the frequency feature of the second image;
   a process of generating a quantized synthesized frequency feature in which a value of an element is represented by a binary value or a ternary value;
   a process of calculating a score indicating a degree to which the quantized synthesized frequency feature is a square wave having a single period; and
   a process of matching the first image against the second image based on the score.

* * * * *